(12) United States Patent
Parrish

(10) Patent No.: US 6,684,722 B1
(45) Date of Patent: Feb. 3, 2004

(54) AVIATORIAL VALVE ASSEMBLY

(76) Inventor: Rob G. Parrish, 4991 Willow St., Bellaire, TX (US) 77401

( * ) Notice: Subject to any disclaimer, the term of this patent is extended or adjusted under 35 U.S.C. 154(b) by 314 days.

(21) Appl. No.: 09/612,354

(22) Filed: Jul. 7, 2000

(51) Int. Cl.$^7$ .................... G01C 19/02; B64C 17/06
(52) U.S. Cl. ........................................ 74/5.22; 244/79
(58) Field of Search .................. 137/625.47, 625.46; 244/79; 74/5.22, 5.43, 5.6 B, 5.7

(56) References Cited

U.S. PATENT DOCUMENTS

| | | | |
|---|---|---|---|
| 1,830,067 A | | 11/1931 | Mellers et al. |
| 2,846,886 A | | 8/1958 | Seifried |
| 3,187,588 A | | 6/1965 | Parker |
| 3,198,031 A | * | 8/1965 | Templin et al. ............... 277/79 |
| 3,264,882 A | * | 8/1966 | Nichols ........................ 74/5.7 |
| 3,265,335 A | * | 8/1966 | McPherson ................... 244/79 |
| 3,610,052 A | | 10/1971 | Strittmatter et al. |
| 3,620,089 A | | 11/1971 | Dunaway |
| 3,664,366 A | | 5/1972 | Munguet |
| 3,692,041 A | * | 9/1972 | Bondi ..................... 137/625.47 |
| 3,920,200 A | | 11/1975 | Evans et al. |
| 4,000,660 A | * | 1/1977 | Brodersen ................. 74/5.6 B |
| 4,036,453 A | | 7/1977 | Evans et al. |
| 4,061,043 A | | 12/1977 | Stiles |
| 4,280,366 A | | 7/1981 | Aberg |
| 4,500,051 A | * | 2/1985 | Cottle, Jr. et al. ......... 244/3.16 |
| 4,504,033 A | * | 3/1985 | Engelking .................. 244/170 |
| 4,552,488 A | | 11/1985 | Elliott-Moore |
| 4,566,494 A | | 1/1986 | Roche |
| 4,606,239 A | | 8/1986 | Guerin |
| 4,706,710 A | * | 11/1987 | Meyer et al. ........... 137/625.47 |
| 4,724,712 A | * | 2/1988 | Malina et al. |
| 4,807,666 A | * | 2/1989 | Morse .................... 137/625.47 |
| 4,850,704 A | | 7/1989 | Zimmerly et al. |
| 4,901,759 A | | 2/1990 | Bellows |
| 4,919,597 A | | 4/1990 | Kistner |
| 4,921,547 A | | 5/1990 | Kosarzecki |
| 5,046,474 A | | 9/1991 | Percy |
| 5,056,549 A | * | 10/1991 | Bouilloux et al. .. 137/625.47 X |
| 5,084,031 A | * | 1/1992 | Todd et al. ......... 137/625.47 X |
| 5,241,990 A | * | 9/1993 | Cook ................. 167/625.47 X |
| 5,251,663 A | | 10/1993 | Christianson et al. |
| 5,368,067 A | | 11/1994 | Cook, Jr. |
| 5,551,242 A | | 9/1996 | Loesch et al. |
| 5,704,396 A | * | 1/1998 | Brillant et al. ...... 137/625.46 X |
| 5,832,959 A | * | 11/1998 | Szymczakowski et al. ..................... 137/625.47 |
| 5,864,111 A | | 1/1999 | Barefoot |
| 6,308,739 B1 | * | 10/2001 | Barbuto et al. ..... 137/625.47 X |

* cited by examiner

Primary Examiner—Roger Pang
(74) Attorney, Agent, or Firm—Conley Rose, P.C.

(57) ABSTRACT

Apparatus, methods, and systems are disclosed for removing stress on gyroscopes during acrobatic flight and for causing gyroscopes to fail in a controlled manner during testing and training. A valve for protecting a pneumatic-gyroscopic aircraft instrument comprises a body and a seat having a selective interrupter and an arm. The selective interrupter is positioned inside the body and can rotate inside the body. A method for protecting a pneumatic-gyroscopic aircraft instrument comprises allowing a pneumatic flow to the instrument during flight, and then, redirecting, selectively, without interrupting the pneumatic flow to the instrument. A system for protecting a pneumatic-gyroscopic aircraft instrument comprises a means for allowing a pneumatic flow to the instrument during flight, and a means for selectively redirecting, without interrupting, the pneumatic flow to the instrument without undue stress on the driver source.

29 Claims, 21 Drawing Sheets

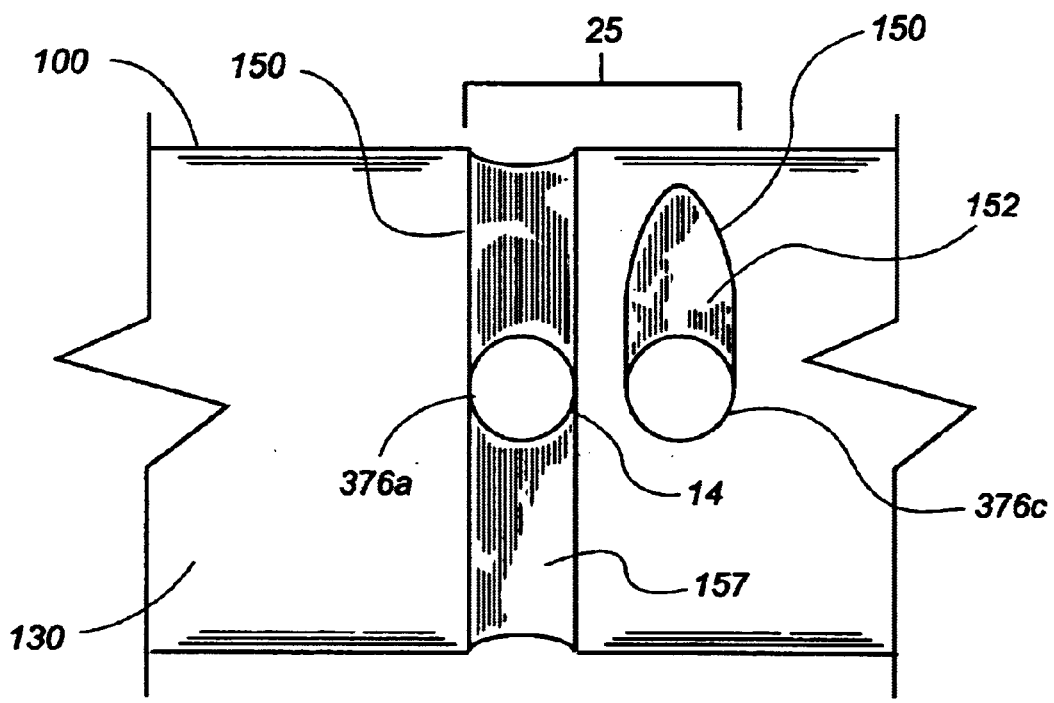
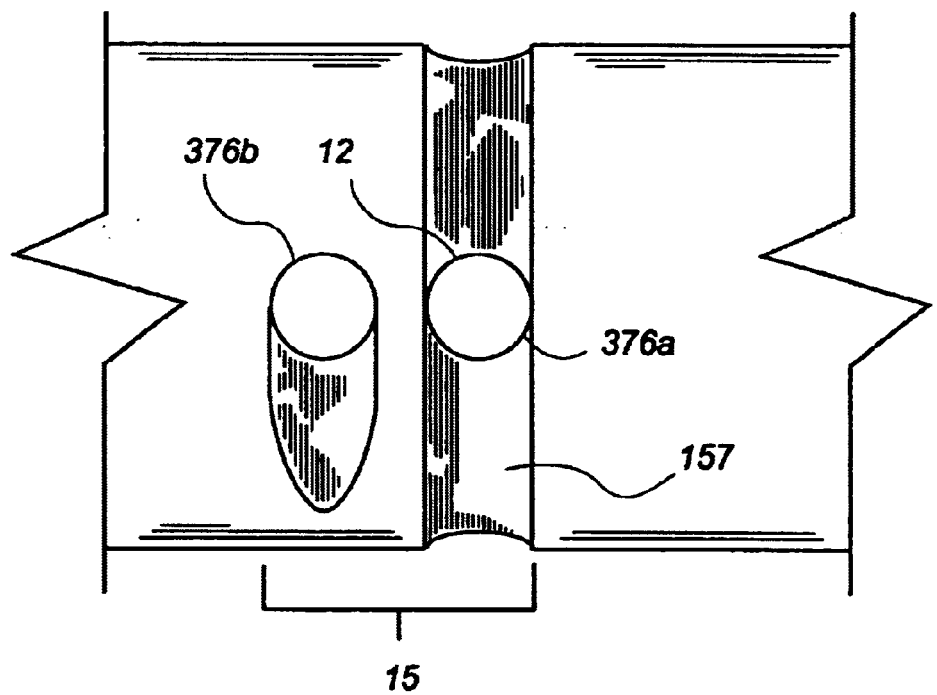
FIG 7

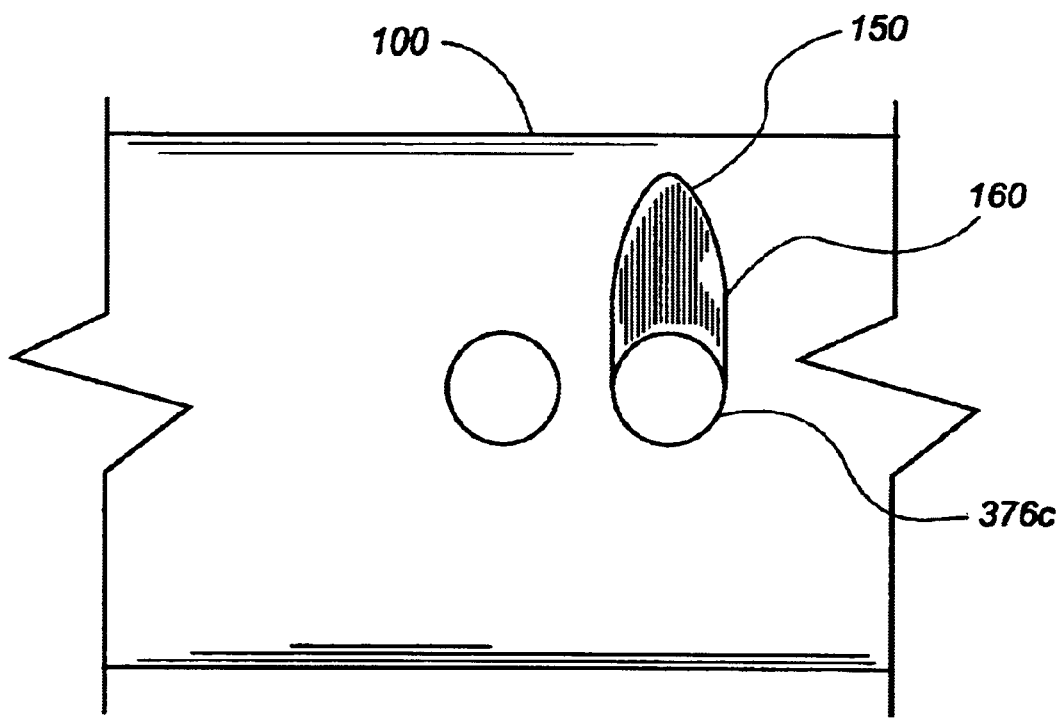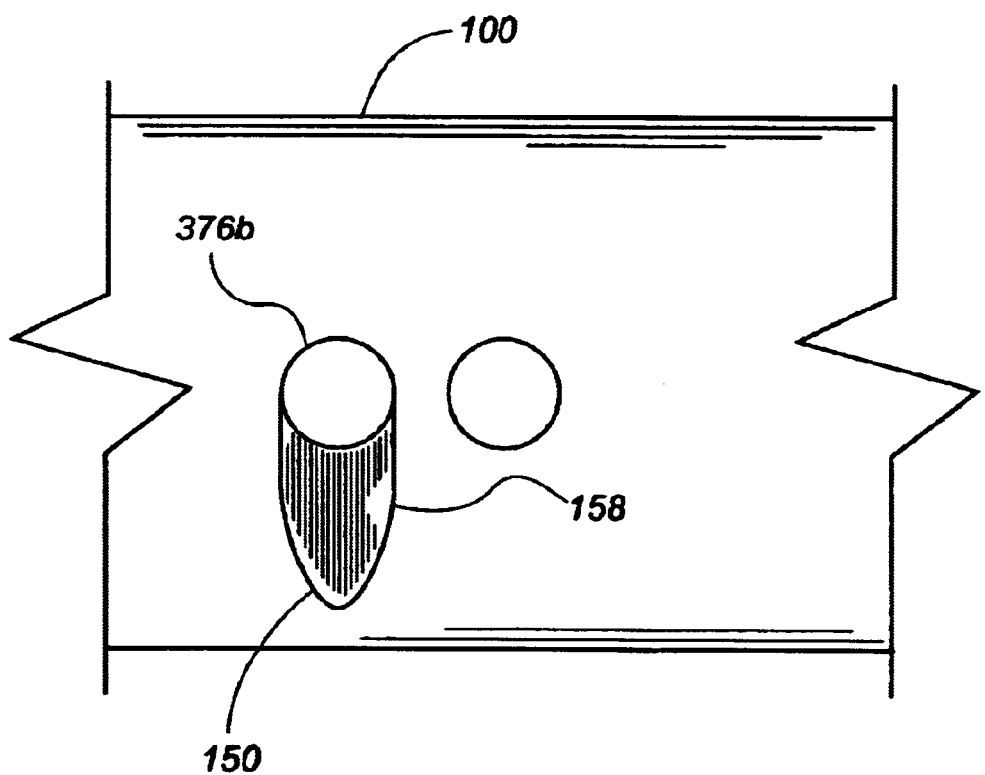
FIG 8

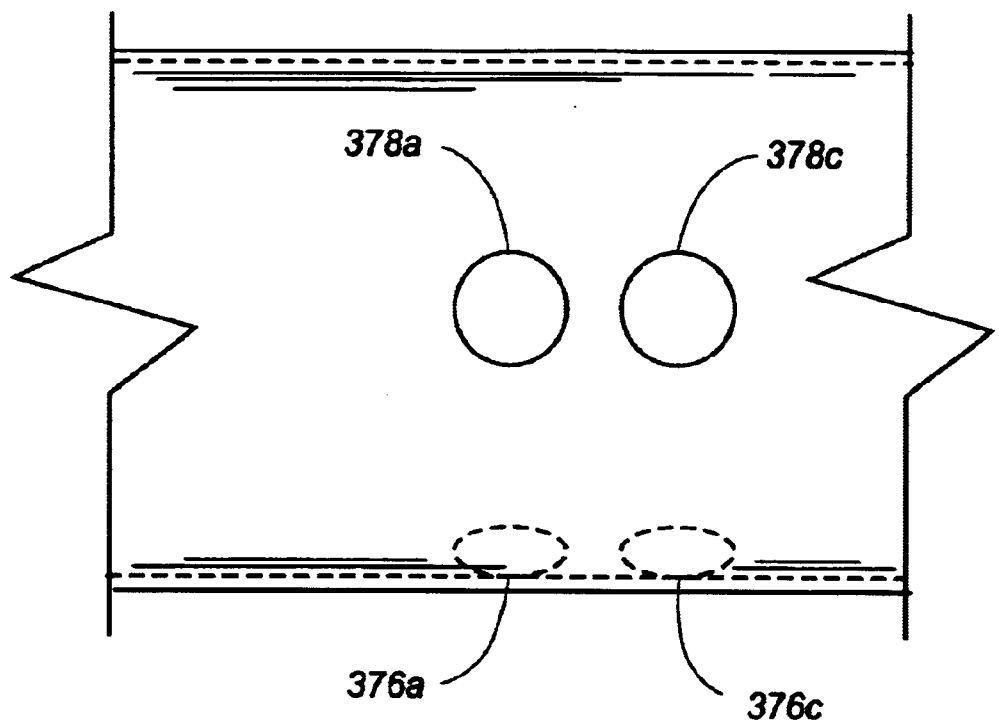
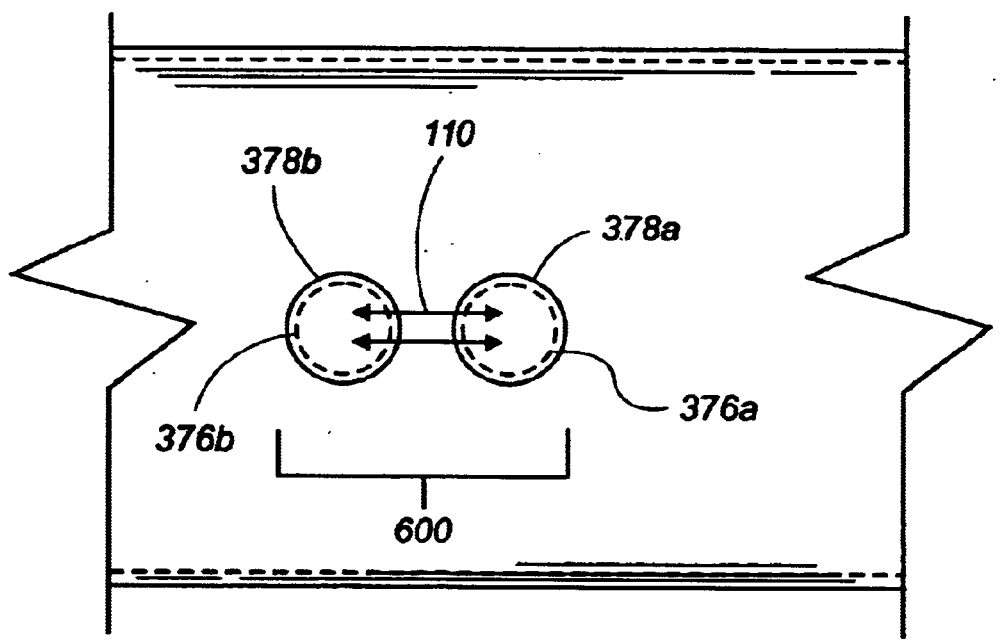
FIG 10

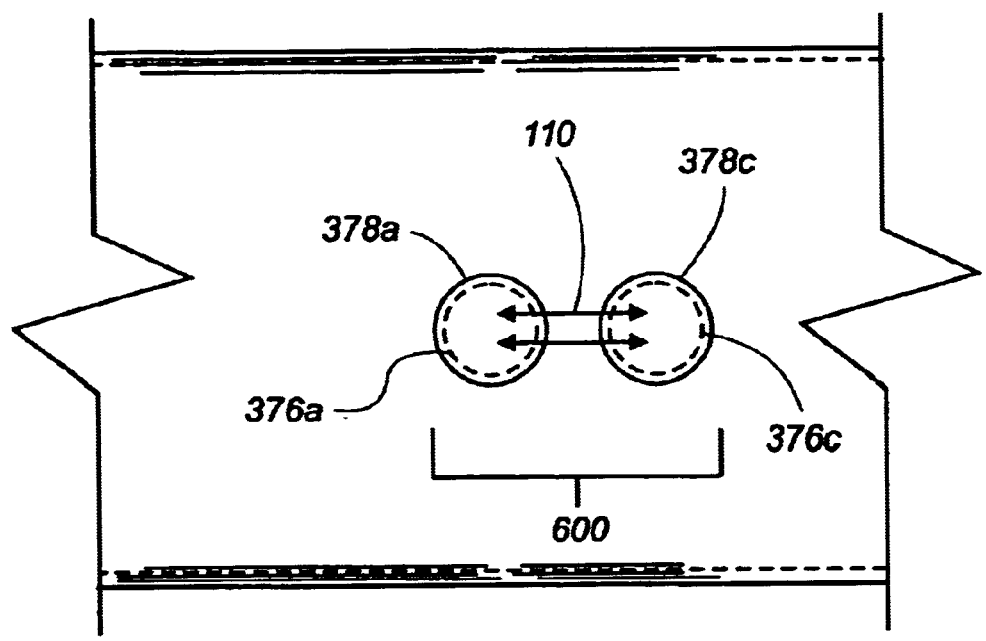
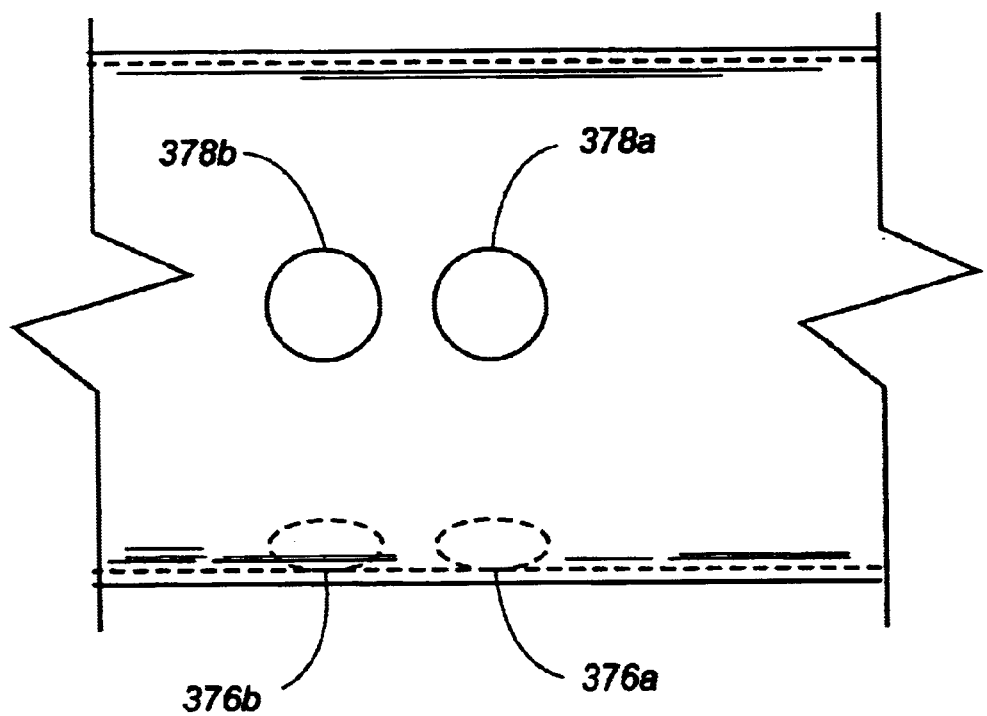
FIG 11

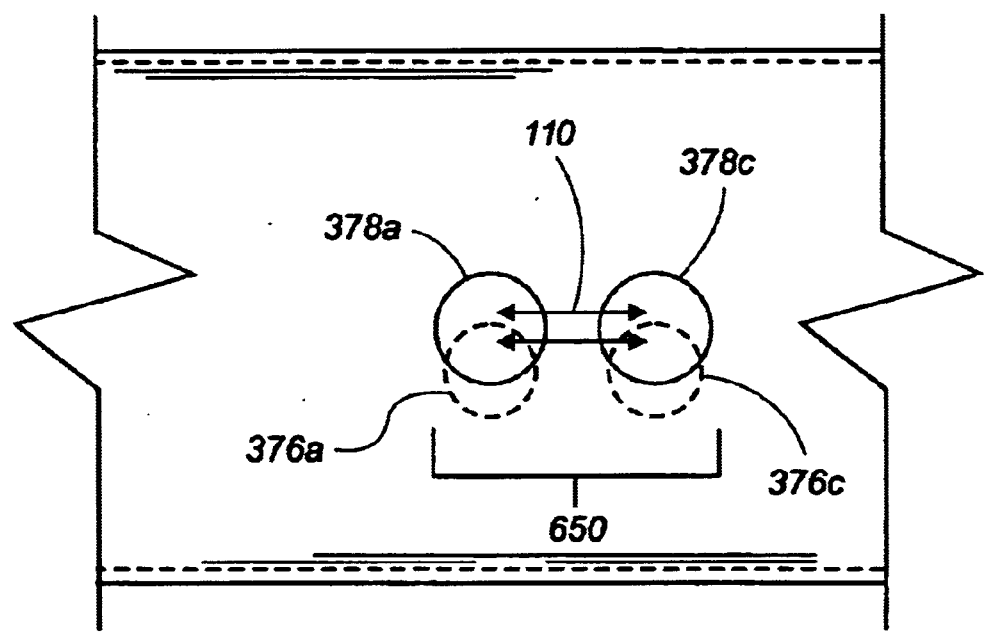
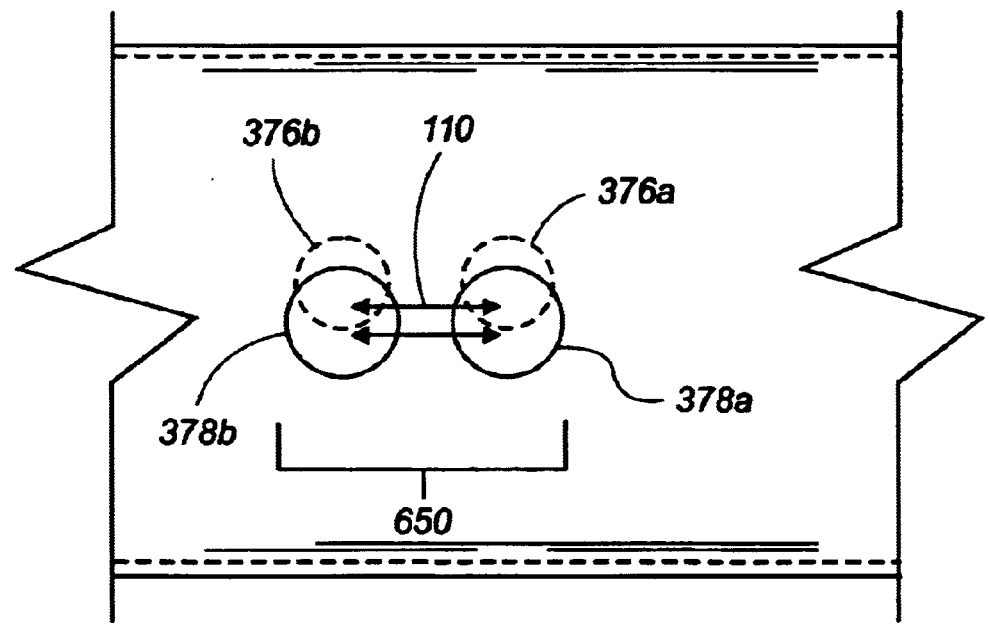
FIG 12

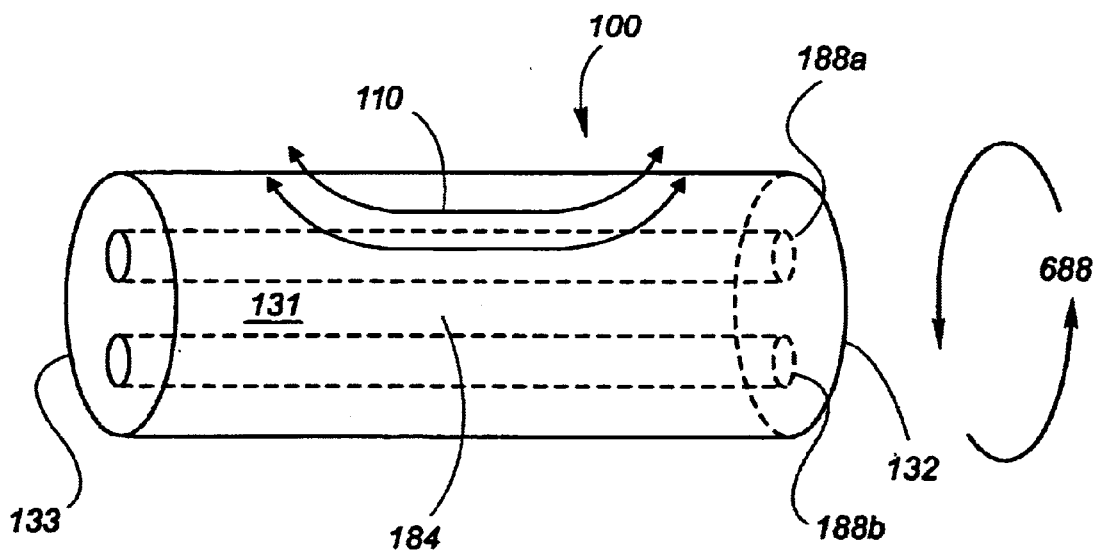
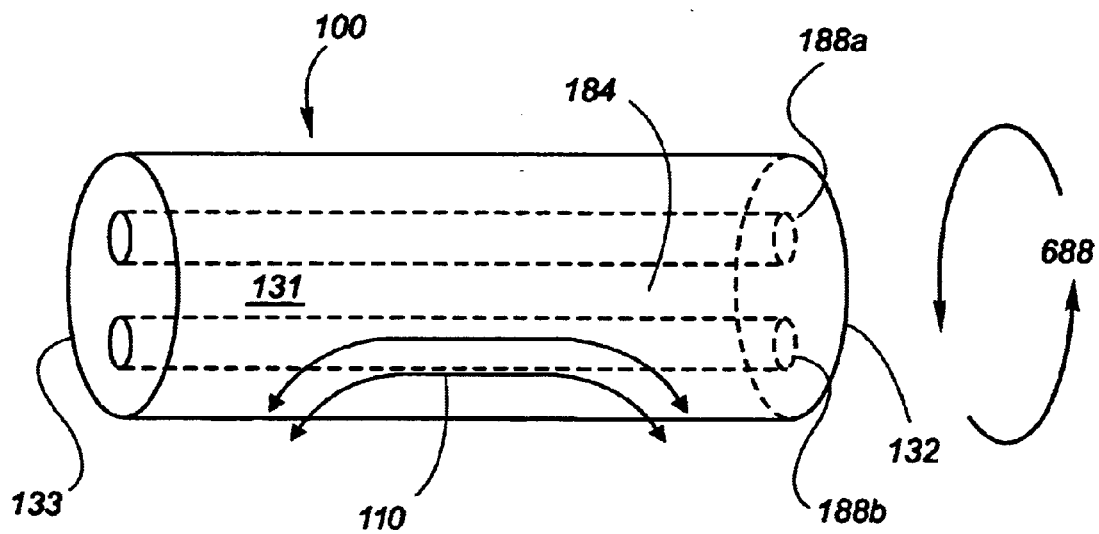
FIG 15

AVIATORIAL VALVE ASSEMBLY

BACKGROUND OF THE INVENTION

Acrobatic and mock emergency maneuvers place undue stress on the pneumatic gyroscopes within aircraft instrumentation. Most of the time, the gyroscopes in aircraft instrumentation are unaccustomed to withstanding routine acrobatic and mock emergency maneuvers. Because extremes in pitch and roll can damage the flight instruments' gimbals and bearings, common practice has been to disconnect the instrumentation's driver source prior to flight. This practice makes it impossible to return to instrument flight should nighttime or inclement weather arise prior to landing. Further, opening the instrument air system may allow airborne contaminants to harm the delicate gyroscopic instruments. Another common practice during testing and training procedures has been to simulate instrument failure, through simulated instrument conditions, by visual obstruction of the instruments. This common practice is unrealistic.

Prior attempts to lock or cage the gyroscopes still fail to prevent the excessive stress and wear on the gyroscopes' gimbals and bearings. In these attempts, mechanical devices are used to hold the gyroscopes rigid, which will not prevent damage to the gyroscopes' gimbals and bearings during acrobatic and mock emergency maneuvers.

In the non-analogous field of oil and gas, back pressure by employing a diverter. In the non-analogous field of physical chemistry, directed at minimizing turbulence back pressure has been diverted without changing the back pressure or primary flow. But such instruments cannot fit within the standard airplane instrument panel.

Accordingly, there is a need for a device, system, and method for disengagement of the instruments in a convenient manner that will, at the same time, protect the instruments.

SUMMARY OF THE INVENTION

According to one aspect of the present invention, a unique configuration and application for a valve is provided. According to this aspect of the invention, a low-pressure valve functions over a wide range of temperature, and selectively interrupts the driver source directed to the pneumatic-gyroscopic flight instruments. The stress that instrument air sources endure is limited by preventing spikes in and maintaining the pneumatic flow, and thus, the back pressure. The valve is lightweight, easily installed, and designed to fit within a standard hole of a small airplane instrument panel. Further, the valve interfaces with existing air and vacuum sources and other equipment within the airplane. This aspect of the present invention permits acrobatic maneuvers without disconnecting the driver source prior to flight. Moreover, the present aspect enables a remarkably rapid return to instrument flight, which safety alone warrants in the event of inclement weather or nighttime.

According to another aspect of the invention, a realistic simulation of instrument failure conditions during testing and training procedures is provided. Because, in this aspect, the present invention can prevent pneumatic flow to the instrument, the instrument becomes non-operational, and thereby, mimics an in-flight instrument failure condition. But the ability to return to instrument flight ensures that safety is coupled to realism in producing the simulated instrument failure.

In a more specific aspect of the invention, a valve is provided for protecting a pneumatic-gyroscopic aircraft instrument. The valve comprises a body, a seat having a selective interrupter and an arm. The arm connects to a first end of the selective interrupter. The selective interrupter is positioned inside the body, wherein the selective interrupter can rotate therein. The valve further comprises a flow arrangement between the selective interrupter and the body. Further, a bonnet connects to the body and the bonnet is in contact with the first end of the body. An actuator connects to the arm, and the arm extends through a hole in the bonnet.

In a further aspect of the invention, a system is provided for protecting a pneumatic-gyroscopic aircraft instrument, and a driver source drives the instrument. The system comprises a means for allowing a pneumatic flow to the instrument during flight, and a means for selectively redirecting, without interrupting, the pneumatic flow to the instrument.

In another aspect of the invention, a method is disclosed for protecting a pneumatic-gyroscopic aircraft instrument, wherein a driver source drives the instrument. The method comprises allowing a pneumatic flow to the instrument during flight, and then, selectively redirecting, without interrupting, the pneumatic flow to the instrument.

BRIEF DESCRIPTION OF THE DRAWINGS

FIG. 7 is two side views, as viewed from each side, of the first aperture of at least three apertures where a routed band encircles the exterior wall of the selective interrupter, and the routed band includes the tops of the first apertures in its path; further shown is an aperture having a routed portion appurtenant to an aperture.

FIG. 8 is two side views, as viewed from each side, of a routed portion appurtenant to the second aperture and a routed portion appurtenant to the third aperture of at least three apertures on the exterior wall of the selective interrupter.

FIG. 10 is two side views of the selective interpreter inside the body, where a first aperture and the second aperture aligning with the first body aperture and the second body aperture, respectively, and the flow arrangement therein.

FIG. 11 is two side views of the selective interpreter inside the body, where a first aperture and the third aperture aligning with the first body aperture and the third body aperture, respectively, and the flow arrangement therein.

FIG. 12 is two side views of the selective interpreter inside the body, where a first aperture, the second aperture and the third aperture partially aligning with the first body aperture, the second body aperture, and the third body aperture, respectively, and the flow arrangement therein.

FIG. 15 is a side view of two separated channels inside the interior of the selective interrupter, where rotary movement of the selective interrupter gradually permits the flow relationship to iteratively transition from solely within the first separated channel to solely within the second separated channel.

DETAILED DESCRIPTION

Figure 1:
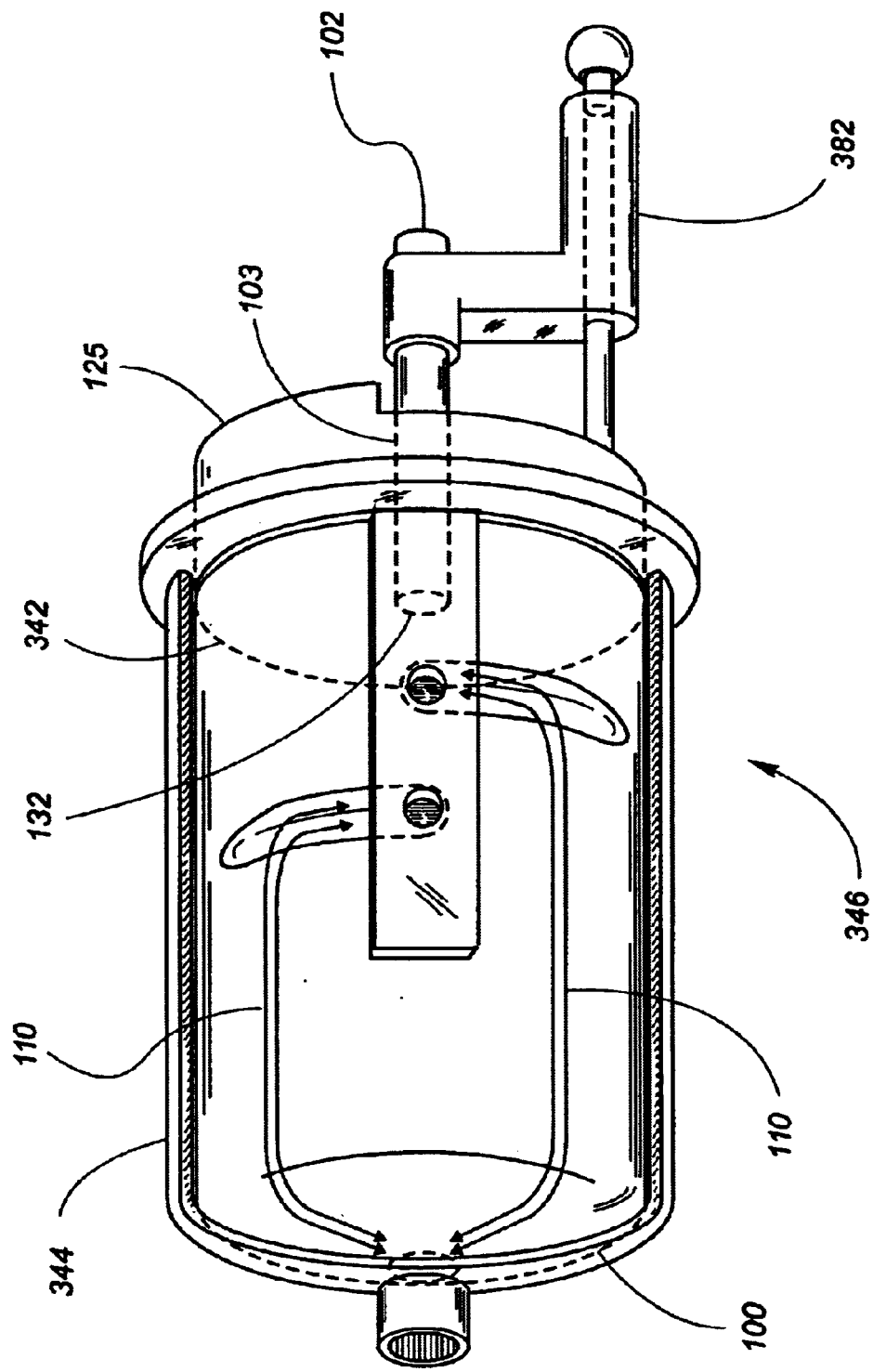
FIG. 1 shows a side view of one embodiment of the valve and the general shape of the valve

A first aspect of invention, as seen in FIG. 1, is a valve (346) for use in aircraft. One embodiment of the valve (346) includes a body (344) and a seat (342) comprising a selective interrupter (100) and an arm (102), wherein the arm (102) is connected to a first end (132) of the selective interrupter (100). The selective interrupter (100) is positioned inside the body (344) for rotation therein. A flow arrangement (110) exists between the selective interrupter (100) and the body (344). A bonnet (125) connects to the body (344) and the bonnet (125) is also in contact with the first end (132) of the body (344). An actuator (382) is movably connected to the arm (102), and the arm (102) is extends through a bonnet hole (103) in the bonnet (125).

Figure 2:
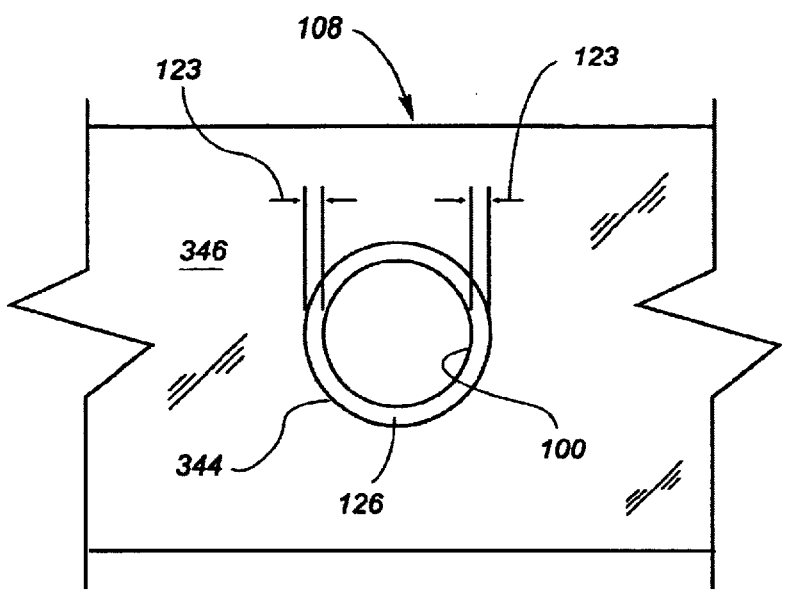
FIG. 2 shows a frontal view of the valve installed in an aircraft instrument panel, the tolerance of the selective interrupter in relation to the body, and the location of the lubricant, if used.

A further embodiment, as shown in FIG. 2, includes the valve (346) being installed into an aircraft instrument panel (108). A still further embodiment includes the valve (346) being installed into a standard hole within the aircraft instrument panel (108).

A further embodiment of the invention includes the valve (346) constructed of a lightweight material. The lightweight material is lighter than some instruments commonly installed in airplanes. In alternative embodiments, the lightweight material is a metal, a non-metal, a metalloid or an alloy. Non-limiting examples of a lightweight material used to construct the valve (346) are aircraft grade aluminum or nylon. In further embodiments of the invention, the valve (346) is constructed of a fire resistant material. Similarly, in alternative embodiments, the lightweight material is a metal, a non-metal, a metalloid or an alloy. An example of a suitable fire resistant material for the valve (346) is aircraft grade aluminum. In still further embodiments, the valve (346) is constructed of an aircraft quality material in order to withstand the pressures that airplane instrumentation necessarily endure. Again, in alternative embodiments, the aircraft quality material is a metal, a non-metal, a metalloid or an alloy. A suitable example of an aircraft quality material is aircraft grade aluminum. Further still, in another embodiment of the invention, the valve (346) is constructed of a temperature-stable material such that the valve (346) functions within the temperature range of −20° F. to 212° F. In alternative embodiments, the temperature-stable material is a metal, a non-metal, a metalloid or an alloy. A suitable example of a temperature-stable material for the valve (346) is aircraft grade aluminum.

Returning to FIG. 1, a still further embodiment of the valve (346) includes the valve (346) having a shape that is a substantially cylindrical shape. A substantially cylindrical shape makes the valve (346) easy to insert into the standard hole of an airplane instrumentation panel (108), which is a primary goal of the instant invention.

A further embodiment of the invention, as shown in FIG. 2, includes the selective interrupter (100) having a minimized tolerance (123) between the selective interrupter (100) and the body (344), wherein the minimized tolerance prevents air leakage from the valve (346). As defined in this invention, the tolerance (123) is the maximum distance between the selective interrupter (100) and the body (344). If the tolerance (123) is such that the leakage of air is minimal, then no lubricant is necessary in order to use the valve (346) in an aircraft. For example, a tolerance of 0.0015 inches between the selective interrupter (100) and the body (344) is sufficiently small that no lubricant (126) is required. In still a further embodiment of the invention, the selective interrupter (100) includes a lubricant (126) between the selective interrupter (100) and the body (344). A lubricant (126) ensures easy rotation of the selective interrupter (100) and intimate contact between the selective interrupter (100) and the body (344) of the valve (346).

Figure 3:
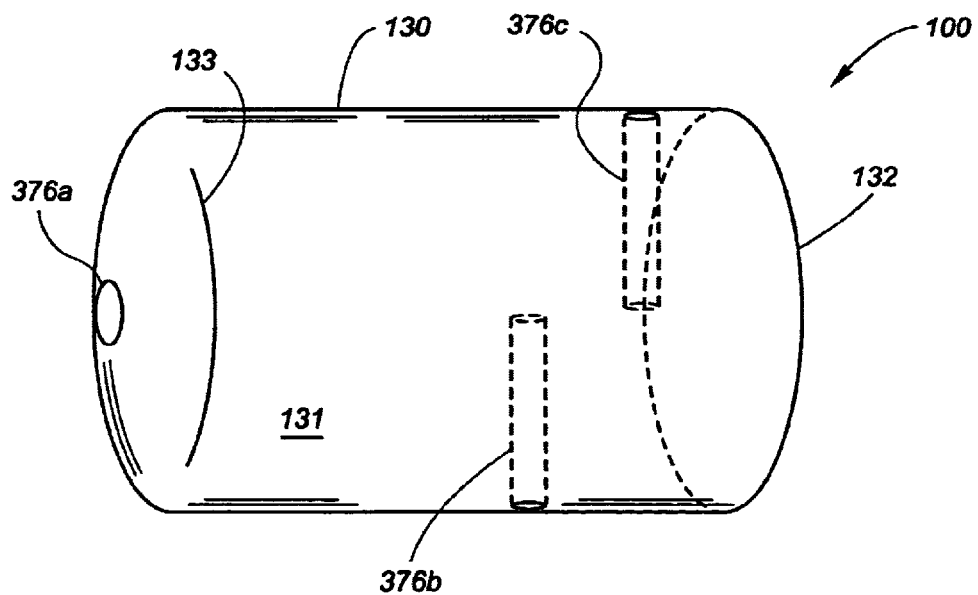
FIG. 3 is a side view of the selective interrupter.

As seen in FIG. 3, a further embodiment of the invention includes the selective interrupter (100) having an exterior wall (130), an interior (131), a first end (132), a second end (133), and at least three apertures (376a, 376b, 376c).

As seen in FIG. 3, one embodiment of the. invention includes the at least three apertures (376a, 376b, 376c) having at least three substantially cylindrical apertures. But further and alternative example embodiments of the invention are the at least three apertures (376a, 376b, 376c) being at least three substantially conical apertures, at least three oval slot-shaped apertures or at least three beveled apertures.

Figure 4:
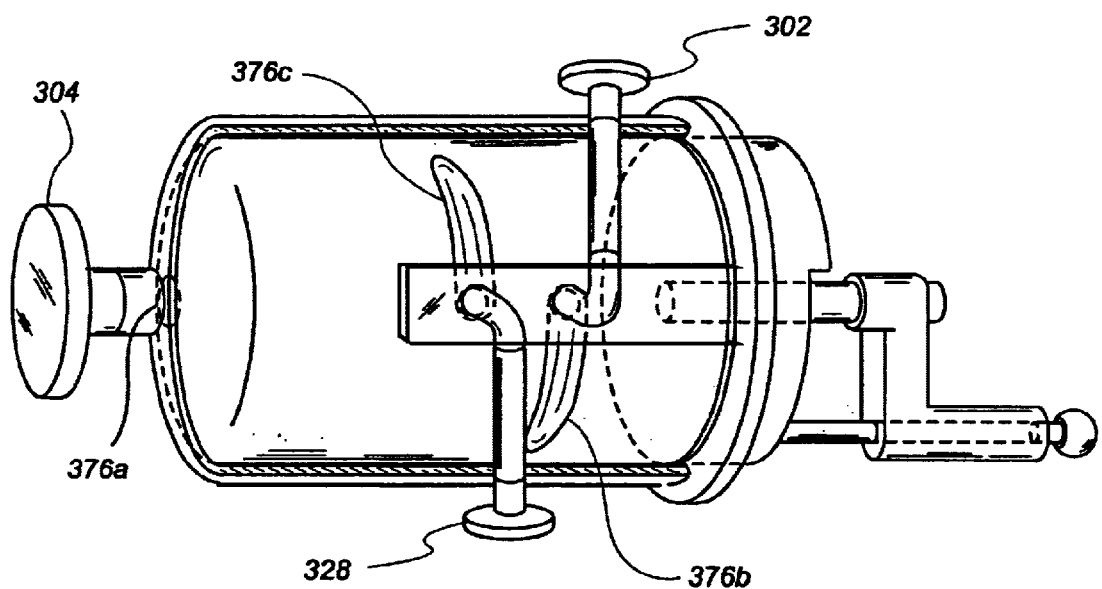
FIG. 4 is a side view of the apertures in contact with the driver source, the instrument, and the dummy load.

In a further embodiment of the invention, as shown in FIG. 4, the at least three apertures (376a, 376b, 376c) include at least a first aperture (376a) of the at least three apertures (376a, 376b, 376c) in contact with a driver source (304), a second aperture (376b) of the at least three apertures (376a, 376b, 376c) in contact with the instrument (302), and a third aperture (376c) of the at least three apertures (376a, 376b, 376c) in contact with a dummy load (328). In still further embodiments of the invention, the dummy load (328) is a resistance dummy load such as a restrictive aperture, a pressure regulator or a vacuum regulator.

Figure 5:
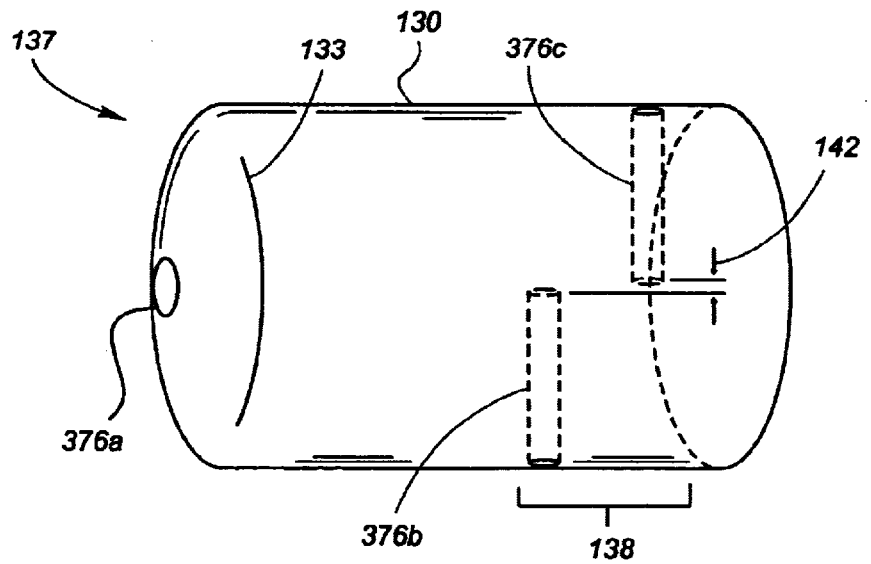
FIG. 5 is a side view of the valve where the staggered arrangement has two apertures horizontally staggered on the exterior wall of the selective interrupter, and a vertical distance between the same two apertures on the exterior wall of the selective interrupter.

Turning to FIG. 5, a further embodiment of the invention includes the at least three apertures (376a, 376b, 376c) being in a staggered arrangement (137). As further embodiment includes the staggered arrangement (137) being a horizontally staggered arrangement (138) of the second aperture (376b) of the at least three apertures (376a, 376b, 376c) and the third aperture (376c) of the at least three apertures (376a, 376b, 376c) along the exterior wall (130). The second end (133) of the selective interrupter (100) includes the at least the first aperture (376a) of the at least three apertures (376a, 376b, 376c).

In still a further embodiment, the horizontally staggered arrangement (138) further includes a vertical separation (142) between the second aperture (376b) of the at least three apertures (376a, 376b, 376c) and the third aperture (376c) of at least three apertures (376a, 376b, 376c). The second aperture (376b) and the third aperture (376c) are vertically positioned on the exterior wall (130) in such a way as to prevent any horizontal overlap in the horizontally staggered arrangement (138).

Figure 6:
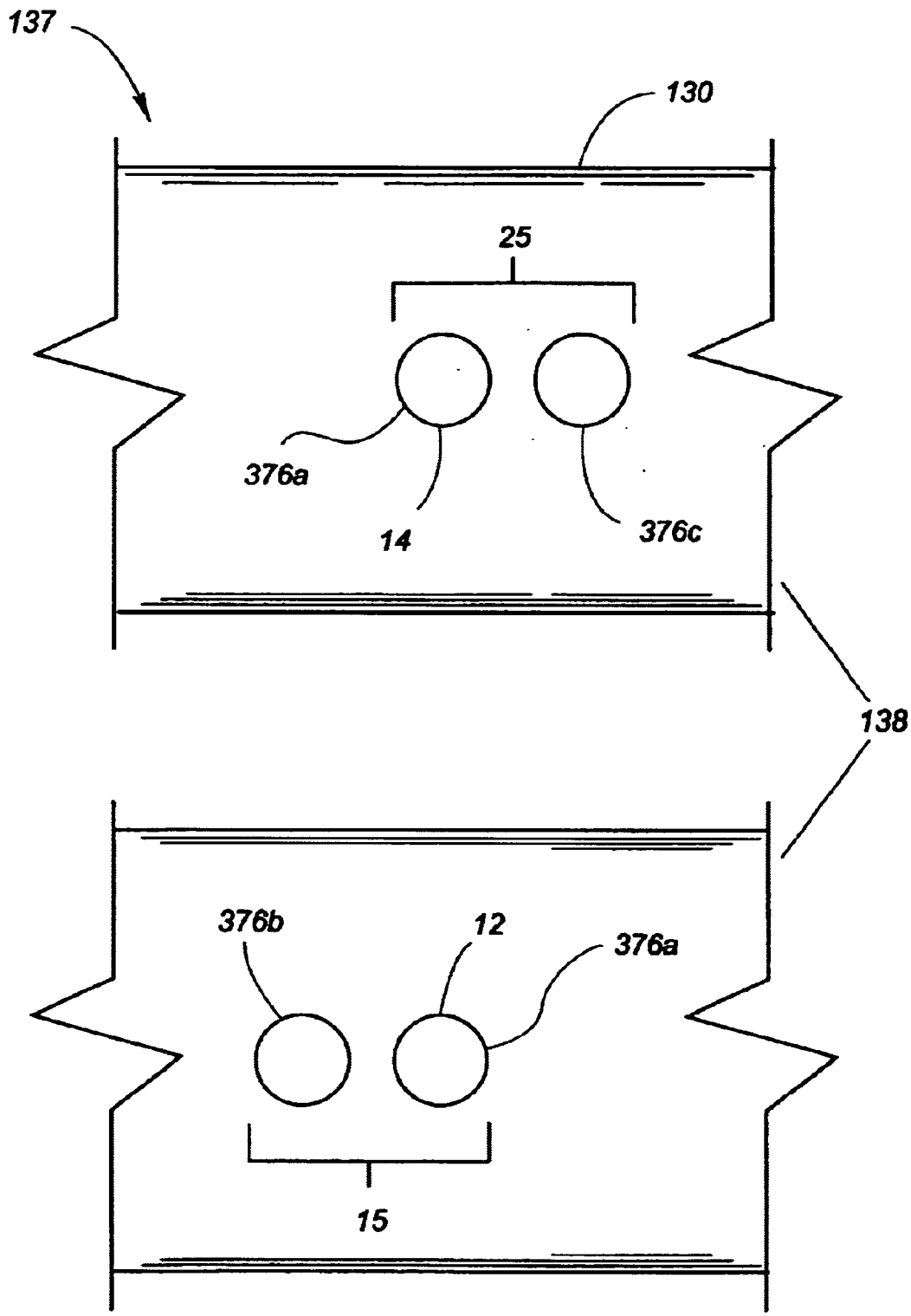
FIG. 6 is two side views of the horizontally staggered arrangement of the apertures on the exterior wall of the selective interrupter as viewed from each side.

Turning now to FIG. 6, a further embodiment of the invention is shown. The staggered arrangement (137) includes a horizontally staggered arrangement (138) of a first set (15) of two apertures of the at least three apertures (376a, 376b, 376c) and a second set (25) of two apertures of the at least three apertures (376a, 376b, 376c) on the exterior wall (130). The first set (15) includes one aperture (12) of the at least the first aperture (376a) of the at least three apertures (376a, 376b, 376c). The first set (15) also includes the second aperture (376b) of the at least three apertures (376a, 376b, 376c). The second set (25) comprises another aperture (14) of the at least the first (376a) of the at least three apertures (376a, 376b, 376c). The second set (25) also includes the third aperture (376c) of the at least three apertures (376a, 376b, 376c).

In a further embodiment of the invention, as shown in FIG. 7, the selective interrupter (100) further includes at least one routed portion (150) that forms a depression (152) in the exterior wall (130) of the selective interrupter (100). In a still further embodiment, the depression (152) in the exterior wall (130) is graduated, and forms at least one graduated routed portion.

In a further embodiment of the invention, the at least one routed portion (150) includes a routed band (157) that is in contact with the one aperture (12) of the at least the first aperture (376a) of the at least three apertures (376a, 376b, 376c) and the another aperture (14) of the at least the first aperture (376a) of the at least three apertures (376a, 376b, 376c). The routed band (157) encircles the exterior wall (130) of the selective interrupter (100). In a still further embodiment, as shown in FIG. 8, the at least one routed portion (150) includes a first routed portion (158) and a second routed portion (160). The first routed portion (158) is appurtenant to the second aperture (376b) of the at least three apertures (376a, 376b, 376c) and the second routed portion (160) is appurtenant to the third aperture (376c) of the at least three apertures (376a, 376b, 376c). In this manner, rotation of the selective interrupter (100) results in a gradual transition in the flow relationship (110). This is to say that there is a gradual transition in the flow relationship (110) from driver source (304) and dummy load (328) to driver source (304) and instrument (302) or vice versa.

Figure 9:
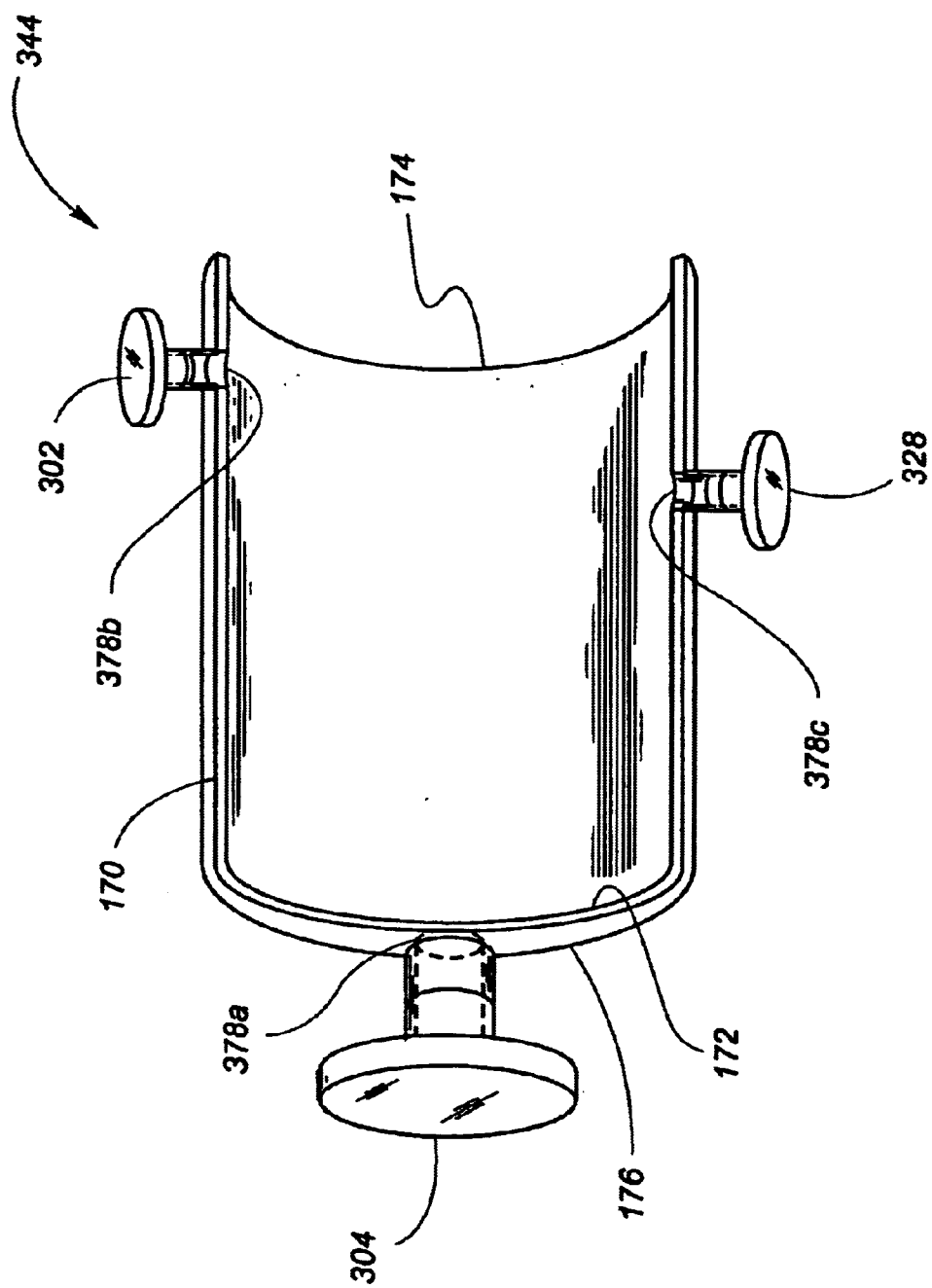
FIG. 9 is a side view of the at least three body apertures located on the outer wall of the body and the at least three body apertures in contact with the driver source, the instrument, and the dummy load.

In a further embodiment of the invention, as shown in FIG. 9, the body (344) includes an outer wall (170), an inner wall (172), a primary end (174), a secondary end (176), and at least three body apertures (378a, 378b, 378c). Although FIG. 9 shows the at least three body apertures (378a, 378b, 378c) having substantially cylindrical shapes, the shapes can vary. For example, in further and alternative embodiments of the invention, the at least three body apertures (378a, 378b, 378c) are substantially cylindrical body apertures, substantially oval-slot shaped body apertures or threaded body apertures.

Also shown in FIG. 9 is a further embodiment, where the at least three body apertures (378a, 378b, 378c) include at least a first body aperture (378a) of the at least three body apertures (378a, 378b, 378c) in contact with the driver source (304), a second body aperture (378b) of the at least three body apertures (378a, 378b, 378c) in contact with the instrument (302), and a third body aperture (378c) of the at least three body apertures (378a, 378b, 378c) in contact with a dummy load (328).

In a still further embodiment of the invention, as shown in FIG. 10, the at least three apertures (376a, 376b, 376c)

and the at least three body apertures (376a, 376b, 376c) are positioned for a flow arrangement (110). The at least the first aperture (376a) of the at least three apertures (376a, 376b, 376c) is in a complete alignment (600) with the at least the first body aperture (378a) of the at least three body apertures (378a, 378b, 378c). Further, the second aperture (376b) of the at least three body apertures (376a, 376b, 376c) is in a complete alignment (600) with the second body aperture (378b) of the at least three body apertures (378a, 378b, 378c). The third aperture (376c) of the at least three apertures (376a, 376b, 376c) is completely misaligned with the third body aperture (378c) of the at least three body apertures (378a, 378b, 378c). Therefore, the flow relationship (110) exists between the first aperture (376a) and the first body aperture (378a) and the second aperture (376b) and the second body aperture (378b).

In an alternative and further embodiment, as shown in FIG. 11, the at least three apertures (376a, 376b, 376c) and the at least three body apertures (376a, 376b, 376c) are positioned for the flow arrangement (110). The at least the first aperture (376a) of the at least three apertures (376a, 376b, 376c) is in a complete alignment (600) with the at least the first body aperture (378a) of the at least three body apertures (378a, 378b, 378c). Further, the third aperture (376c) of the at least three body apertures (376a, 376b, 376c) is in a complete alignment (600) with the third body aperture (378c) of the at least three body apertures (378a, 378b, 378c). But the second aperture (376b) of the at least three apertures (376a, 376b, 376c) is completely misaligned with the second body aperture (378b) of the at least three body apertures (378a, 378b, 378c). Therefore, the flow relationship (110) exists between the first aperture (376a) and the first body aperture (378a) and the third aperture (376c) and the third body aperture (378c).

In a still further and alternative embodiment, as shown in FIG. 12, the at least three apertures (376a, 376b, 376c) and the at least three body apertures (376a, 376b, 376c) are positioned for the flow arrangement (110). The at least the first aperture (376a) of the at least three apertures (376a, 376b, 376c) is in a partial alignment (650) with the at least the first body aperture (378a) of the at least three body apertures (378a, 378b, 378c). Further, the second aperture (376b) of the at least three apertures (376a, 376b, 376c) is in a partial alignment (650) with the second body aperture (378b) of the at least three body apertures (378a, 378b, 378c). Further still, the third aperture (376c) of the at least three apertures (376a, 376b, 376c) is in a partial alignment (650) with the third body aperture (378c) of the at least three body apertures (378a, 378b, 378c). Therefore, the flow relationship (110) is between all of the at least three apertures (376a, 376b, 376c) and the at least three body apertures (378a, 378b, 378c).

Figure 13:
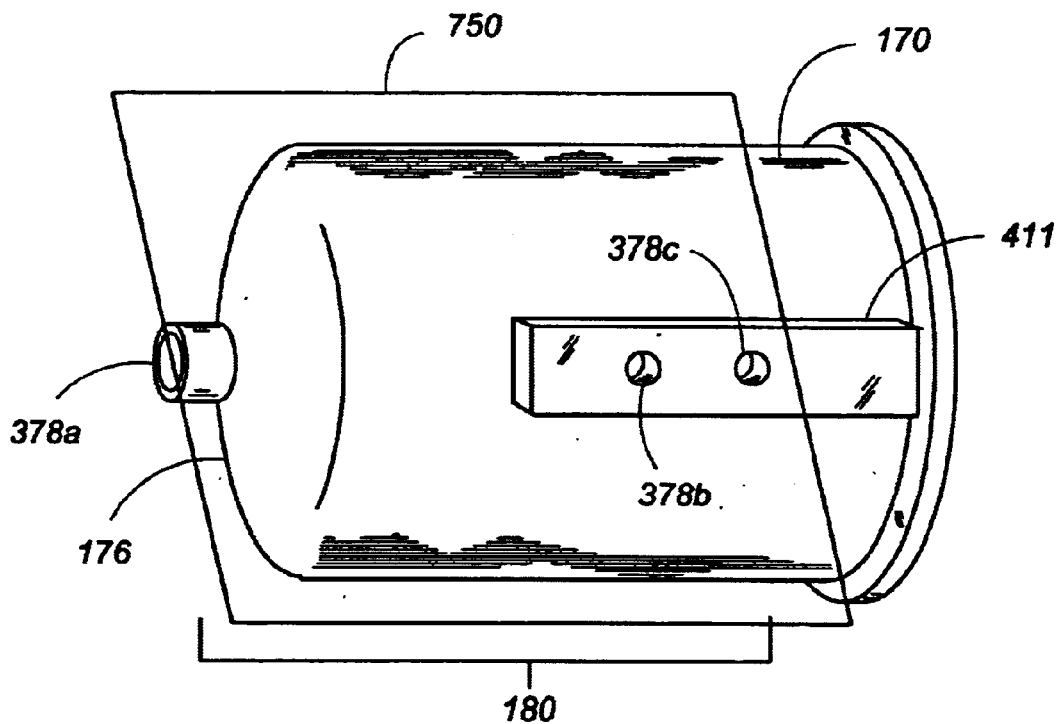
FIG. 13 is a side view of the horizontally staggered alignment of two body apertures on the outer wall of the body, the first body aperture on the second end of the body, and the imaginary vertical plane that bisects all three body apertures.

In a further embodiment of the invention, as shown in FIG. 13, the at least three body apertures (378a, 378b, 378c) include a horizontally staggered arrangement (180). The a horizontally staggered arrangement (180) includes the second body aperture (378b) and the third body aperture (378c) of the at least three body apertures (378a, 378b, 378c) on the outer wall (170), and the secondary end (176) comprises the at least the first body aperture (378a) of the at least three body apertures (378a, 378b, 378c). Further, the at least three body apertures (378a, 378b, 378c) are positioned such that a vertical plane (750) bisects the at least three body apertures (378a, 378b, 378c).

In a further embodiment, the outer wall (170) further includes a raised block (411). The second body aperture (378b) and the third body aperture (378c) of the at least three body apertures (378a, 378b, 378c) are within the raised block (411). Further still, the raised block (411) is integrally connected to the outer wall (170). A non-limiting example of the integral connection is welding the raised block (411) to the outer wall (170).

Figure 14:
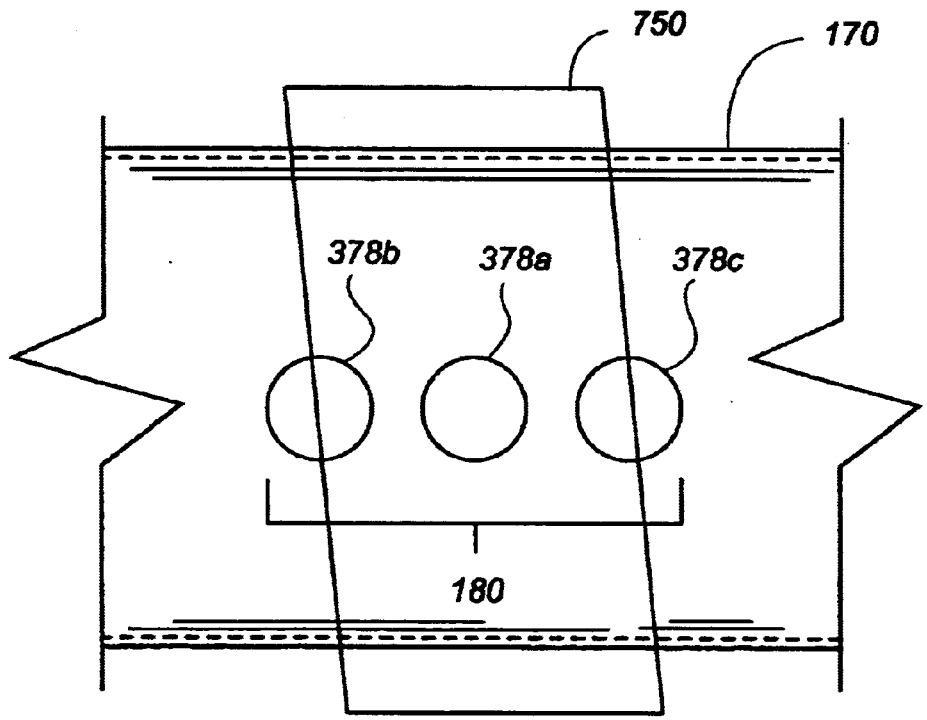
FIG. 14 is a side view of the horizontally staggered alignment of three body apertures on the outer wall of the body, and the imaginary vertical plane that bisects all three body apertures.

As seen in FIG. 14, a further embodiment of the invention includes a horizontally staggered arrangement (180) of the at least three body apertures (378a, 378b, 378c) on the outer wall (170), wherein the at least three body apertures (378a, 378b, 378c) are positioned such that a vertical plane (750) bisects the at least three body apertures (378a, 378b, 378c).

In a further embodiment of the invention, as seen in FIG. 15, the interior (131) of the selective interrupter (100) is a hollow cavity (184) that is open at the second end (133) of the selective interrupter (100). As such, in some embodiments, the second end (133) is the first aperture (376a) of the at least three apertures (376a, 376b, 376c).

In a still further embodiment of the invention, the interior (131) includes at least two separated channels (188a, 188b) within the interior (131) of the selective interrupter (100). A further embodiment, as shown in FIG. 15, includes the at least two separated channels (188a, 188b) being a first separated channel (188a) and a second separated channel (188b). In this embodiment, each of the at least two separated channels (188a, 188b) are positioned between the first end (132) and the second end (133). Further, the at least two separated channels (188a, 188b) are positioned such that rotary movement (688) of the selective interrupter (100) gradually permits the flow relationship (110) to iteratively transition from solely within the first separated channel (188a) to solely within the second separated channel (188b).

In a further embodiment of the invention, the at least two separated channels (188a, 188b) are at least two substantially cylindrical channels. But in further and alternative embodiments, the at least two separated channels (188a, 188b) are substantially conical channels or threaded channels. Other shapes and arrangements of the channels will occur to those of ordinary skill in the art, but these other shapes and arrangements do not depart from the scope of the present invention.

Figure 16:
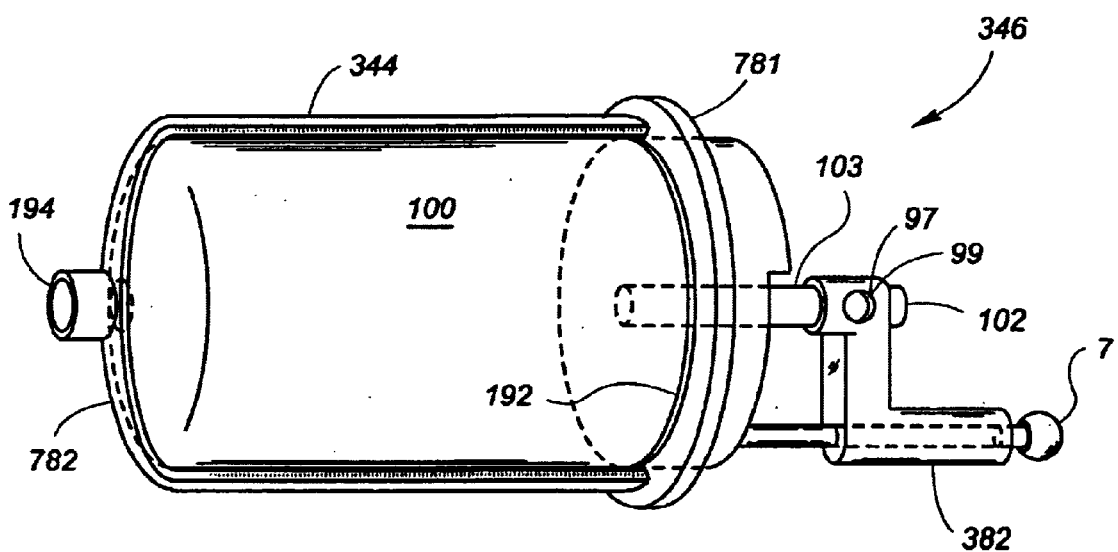
FIG. 16 is a side view of an arm extending through the arm hole of the actuator; further, an arm connection hole and an actuator connection hole through which connecting cylinders pass in order to connect the actuator to the arm; further shown is a side view of at least a partially opened second end and a closed first end of the selective interrupter setting inside a body having a closed secondary end an opened primary end.

As shown in FIG. 16, a further embodiment of the invention includes the first end (132) being a closed end (192). In another embodiment of the invention, the second end (133) is at least a partially open end (194). In still a further embodiment, as seen in FIG. 29b, the primary end (174) of the body (344) comprises an open end (781), and the secondary end (176) of the body (344) comprises a closed end (782).

Also as shown in FIG. 16, the arm (102) has a substantially cylindrical shape, which is a further embodiment of the invention. The arm (102) is connected to the actuator (382). A further embodiment is a handle (7) connected to the actuator (382).

Figure 17:
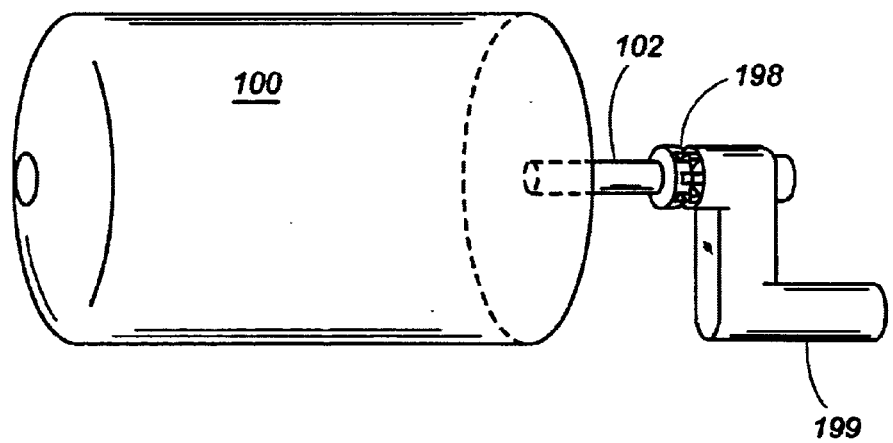
FIG. 17 is a side view of gearing on the arm and a geared drive shaft.

As shown in FIG. 17, a further embodiment of the invention includes the arm (102) having gearing (198), which in alternative embodiments is keyed gearing, screwed gearing, or any other type of gearing occurring to those of ordinary skill in the art. In a still further embodiment of the invention, the actuator (382) includes a geared drive shaft (199) in mesh with the gearing (198).

A further embodiment of the invention includes the actuator (382) having a motor that is connected to a drive shaft. The motor provides the power to move the drive shaft, which moves the actuator (382), which in turn, moves the selective interrupter (100). In a further and alternative embodiment of the invention, the actuator (382) includes a solenoid (4), which transforms its electrical energy into mechanical energy, and thereby actuates the selective interrupter (100).

Returning to FIG. 16, a further embodiment of the invention includes the actuator (382) having an arm hole (103) that is positioned to at least partially receive the arm (102). In a still further embodiment, the arm (102) includes an arm connection hole (99). In a still further embodiment, the actuator includes an actuator connection hole (97). Moreover, as shown in FIG. 18, a further embodiment of the invention includes connecting cylinders (94) for connecting the actuator (382) to the arm (102).

In a further and alternative embodiments, the connecting cylinder (94) is a bolt, which may be a screw, a dog-nose screw, a pin or any other device that will movably secure the arm (102) to the actuator (382). In a still further embodiment, the connecting cylinder (94) is threadedly connected to the actuator (382) and the arm (102). Further, in yet another embodiment of the invention, the connecting cylinder (94) is threadedly connected to a nut (89).

Figure 18:
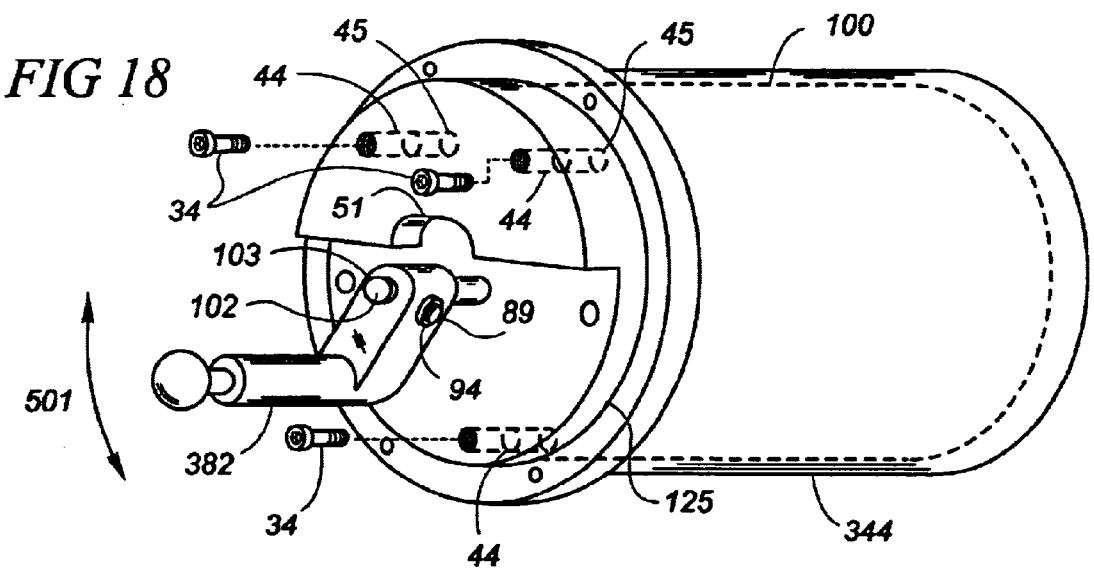
FIG. 18 is a side view of connecting cylinders for connecting the actuator to the arm, the nut used to secure the connecting cylinder, a plurality of mounting cylinders connecting the bonnet to the body through the plurality of mounting holes and receptacle cylinder holes, and a raised stop for limiting the rotary movement of the actuator, and thereby, the selective interrupter.

As shown in FIG. 18, a further embodiment of the invention includes a plurality of mounting holes (44) positioned for connecting of the bonnet (125) to the body (344). In a still further embodiment of the invention, the body (344) includes a plurality of receptacle cylinder holes (45) positioned for connecting of the body (344) to the bonnet (125). In order to fill the plurality of mounting holes (44) and the plurality of receptacle cylinder holes (45), a further embodiment of the invention, as shown in FIG. 40, includes a plurality of mounting cylinders (34) positioned to connect the bonnet (125) to the body (344).

In a further embodiment, the plurality of mounting cylinders (34) are connected to the body (344) and the bonnet (125). In a further and alternative embodiment, the plurality of mounting cylinders (34) are threadedly connected to the body (344) and the bonnet (125). Further, alternative embodiments of the invention include the plurality of mounting cylinders (34) being a plurality of bolts or a plurality of pins.

In another embodiment of the invention, the bonnet (125) further includes a stop (50). The stop (50) limits the rotary movement (501) of the selective interrupter (100). As such, in one embodiment, the stop (50) is a raised stop (51), which prevents the actuator (382) from turning beyond a certain maximum. In turn, this limits the rotation of the selective interrupter (100). The raised stop (51) prevents the user from endlessly actuating the selective interrupter (100), and thereby, the raised stop (51) adds safety and ease of use to the design of the valve (346).

Figure 19A:
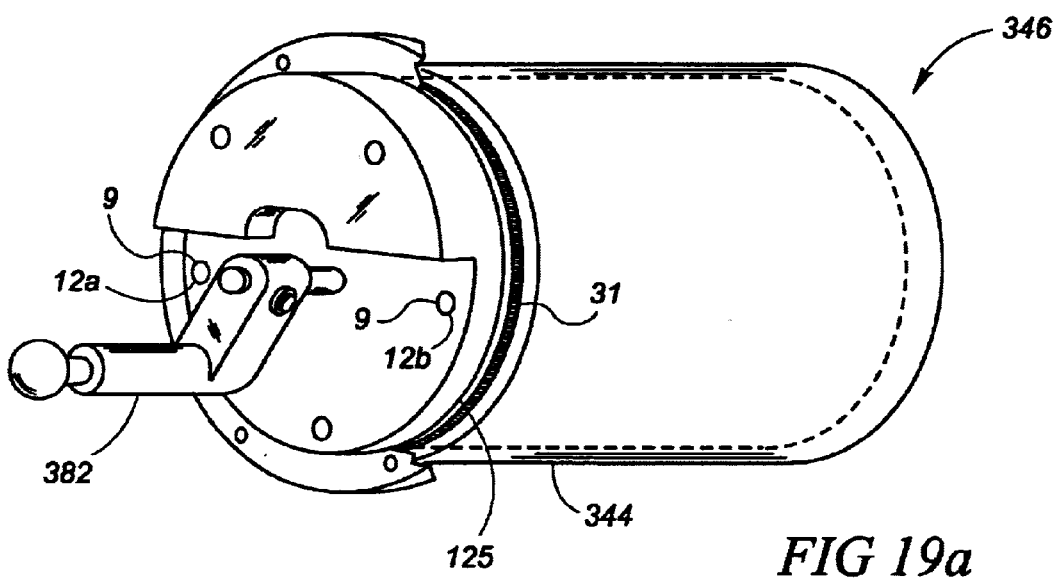
FIG. 19a is a side view of a friction member in between the bonnet and the body, and two pressure pinholes that receive the pressure pin and lock the actuator into position.

In a further embodiment, as shown in FIG. 19a, a friction member (30) is located between the bonnet (125) and the body (344). An example of such a friction member (30) is an o-ring (31). But a friction member (30) is not necessary if the tolerance (123) is sufficiently small so that the bonnet (125) effectively seals the body (344) once the bonnet (125) is connected to the body (344).

Figure 19B:
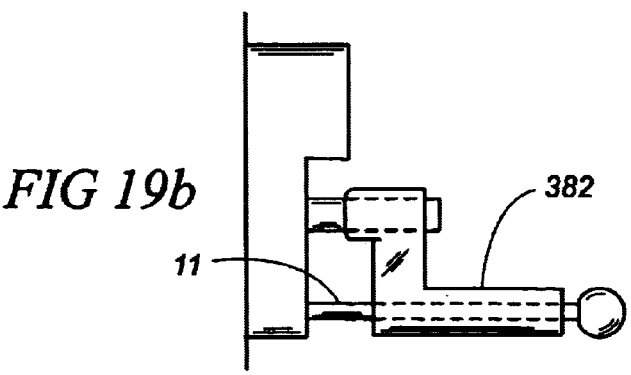
FIG. 19b shows a pressure pin extending from the actuator.

As shown in FIG. 19b, a further embodiment of invention includes the actuator (382) having a pressure pin (11). A still further embodiment of the invention, as shown in FIG. 19a, includes the bonnet (125) also having at least two pressure pinholes (12a, 12b) for sliding the pressure pin (11) into a locked position (9) on the bonnet (125). Depending on which of the at least two pressure pinholes (12a, 12b) that the pressure pin (11) is located, the flow arrangement (110) either includes the instrument (302) or the dummy load (328).

In a further embodiment of the invention, the actuator (382) includes a software program that will control the rotation of the selective interrupter (100) based on data input from various sensing devices within or external to the airplane. For example, the software program will determine the frequency, speed and degree to which the at least three apertures (376a, 376b, 376c) and the at least three body apertures (378a, 378b, 378c) should be open in order to maintain a balanced pressure system.

Figure 20:
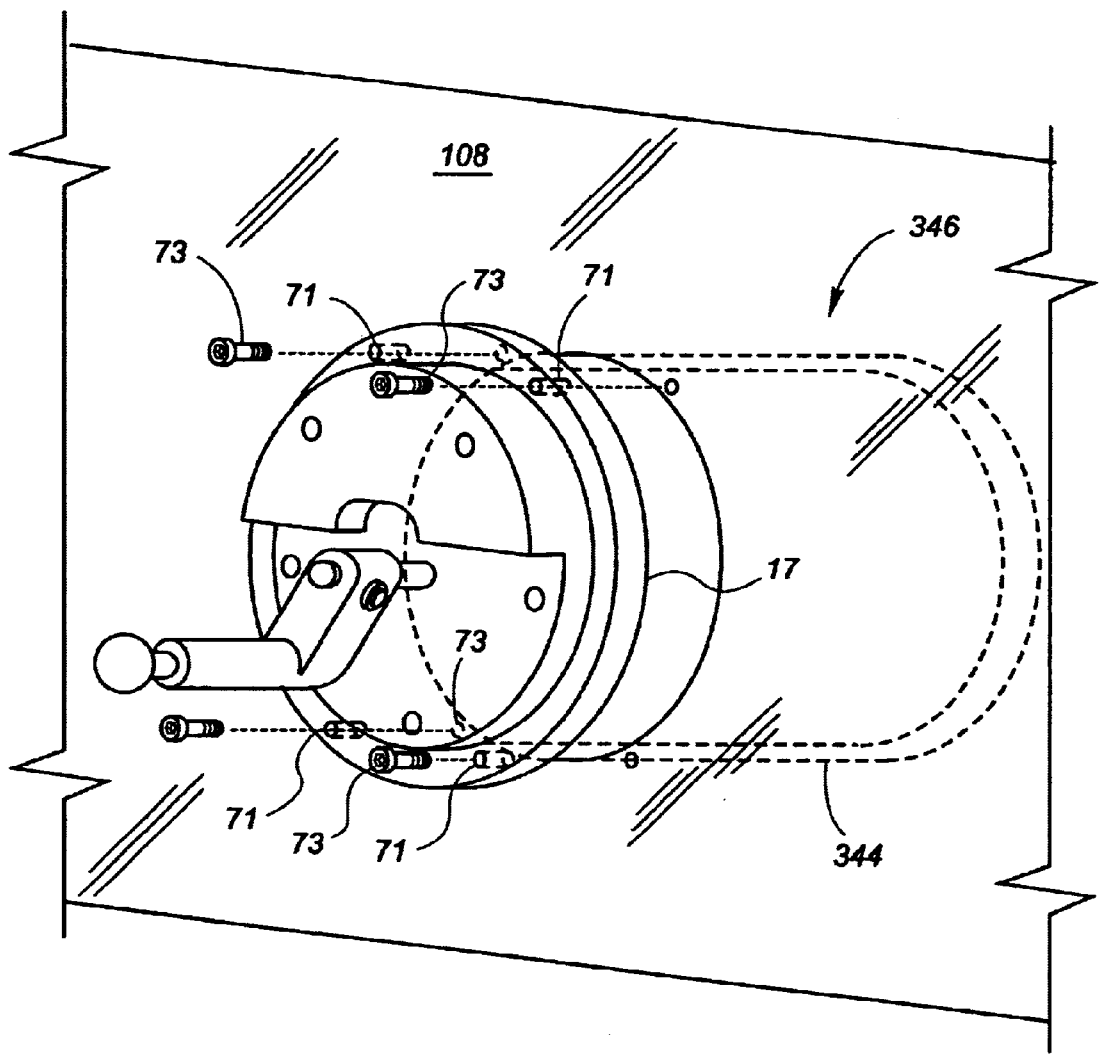
FIG. 20 is a side view of the lip on the body of the valve, a plurality of installation holes on the lip, and a plurality of installation cylinders used to connect the valve into the aircraft instrument panel.

As seen in FIG. 20, a further embodiment of the invention includes the body (344) having a lip (17). In a still further embodiment, the lip (17) includes a plurality of installation holes (71) that are positioned for installing the valve (346) into an aircraft instrument panel (108). In a still further embodiment, the lip (17) also includes a plurality of installation cylinders (73) that are positioned for installing the valve (346) into an aircraft instrument panel (108).

Figure 21:
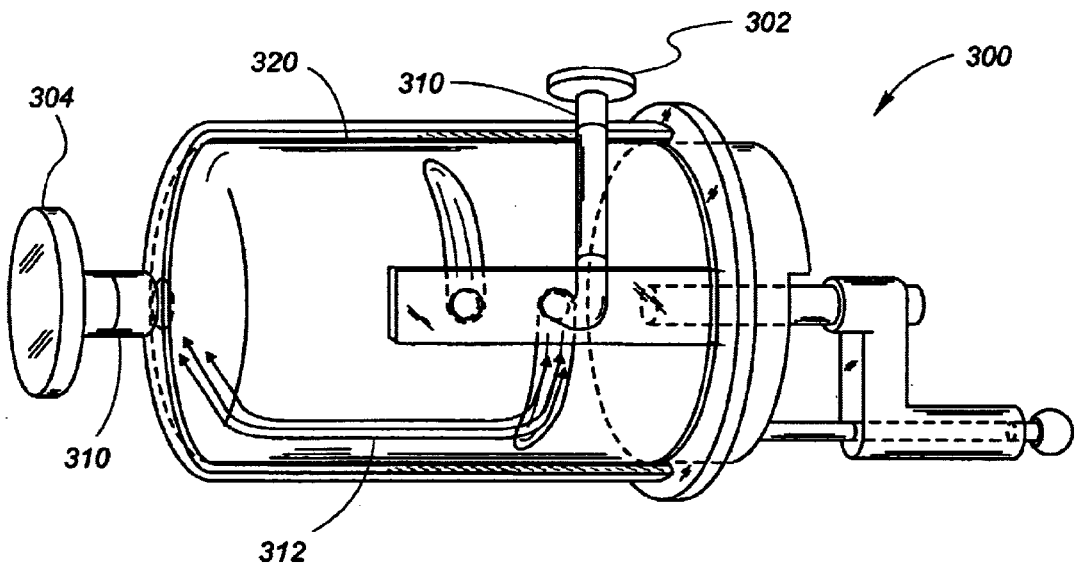
FIG. 21 is a side view of a system that includes a valve, connections to a driver source and the instrument, and the pneumatic flow between the driver source and the instrument.

Turning now to FIG. 21, a second aspect of the invention is seen—a system. The system (300) is for protecting a pneumatic-gyroscopic aircraft instrument (302), where the instrument (302) is driven by a driver source (304). The system (300) includes a means (310) for allowing a pneumatic flow (312) to the instrument (302) during flight, and a means (320) for selectively redirecting the pneumatic flow (312) to the instrument (302) without interrupting the pneumatic flow (312) of the driver source (304).

The driver source (304) is a pressure source or a vacuum source.

Figure 22:
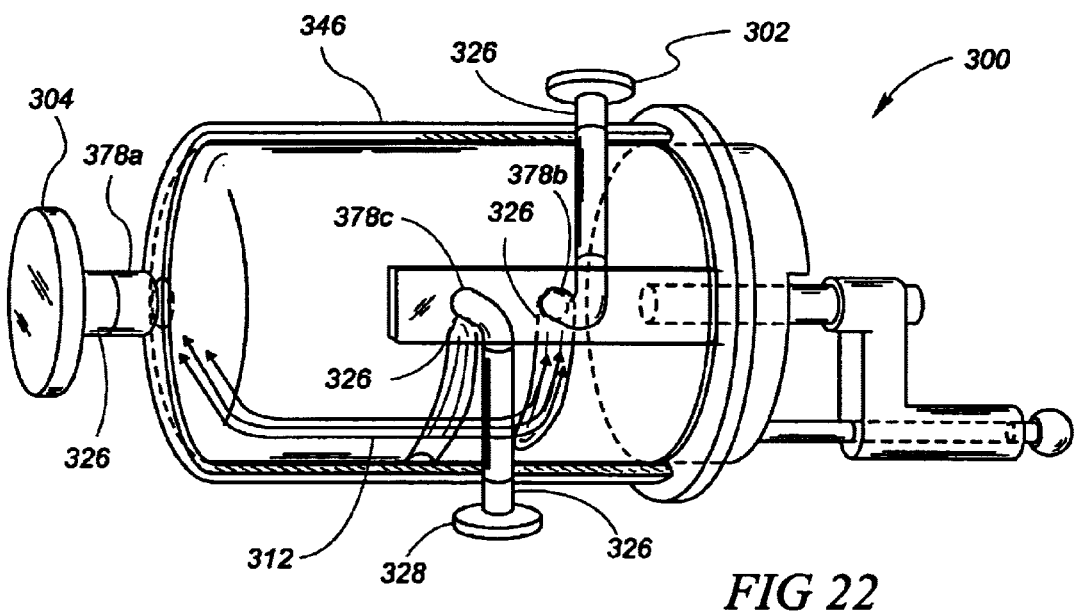
FIG. 22 is a side view of a system where the valve is coupled to the driver source, the instrument, and a dummy load at three different body apertures, and the pneumatic flow is solely between the driver source and the instrument.

In a further embodiment, as shown in FIG. 22, the means (310) for allowing the pneumatic flow (312) to the instrument (302) comprises a means (326) for coupling, through a valve (346), the driver source (304) to the instrument (302). In a still further embodiment, the valve (346) includes a first body aperture (378a) of at least three body apertures (378a, 387b, and 387c) coupled to the driver source (304) and a second body aperture (378b) of the at least three body apertures (378a, 387b, and 387c) coupled to the instrument (302). The coupling, itself, is through the use of standard aircraft tubing or any other material that can suitably couple the valve to the instrument (302) and the driver source (304).

Figure 23:
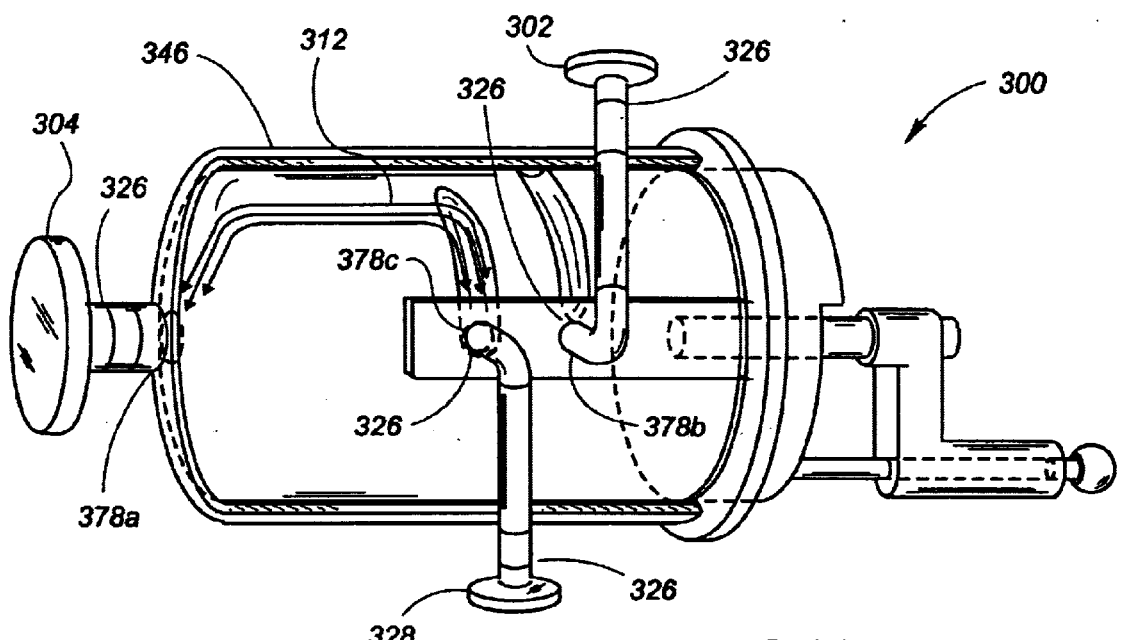
FIG. 23 is a side view of a system where the valve is coupled to the driver source, the instrument, and a dummy load at three different body apertures, and the pneumatic flow is solely between the driver source and the dummy load.

As shown in FIG. 23, a further embodiment of the invention is a means (320) for selectively redirecting, without interrupting, the pneumatic flow (312) to include a means (326) for coupling, through a valve (346), the driver source (304) to a dummy load (328). In a still further embodiment of the invention, a first body aperture (378a) of at least three body apertures (378a, 387b, and 387c) is coupled to the driver source (304) and a third body aperture (378c) of the at least three body apertures (378a, 387b, and 387c) is coupled to the dummy load (328). Again, the coupling, itself, is through the use of standard aircraft tubing or any other material that can suitably couple the valve to the driver source (304) and to a dummy load (328).

Figure 24:
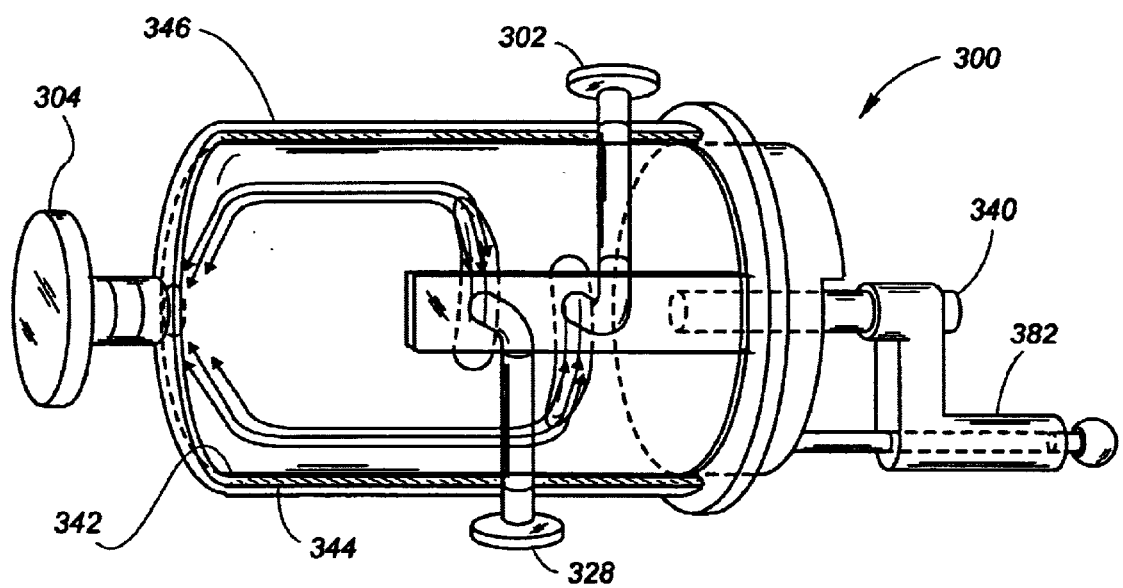
FIG. 24 is a side view of a system where the valve is coupled to the driver source, the instrument, and a dummy load at three different body apertures, and the pneumatic flow is between the driver source, the instrument, and a dummy load.
Figure 25:
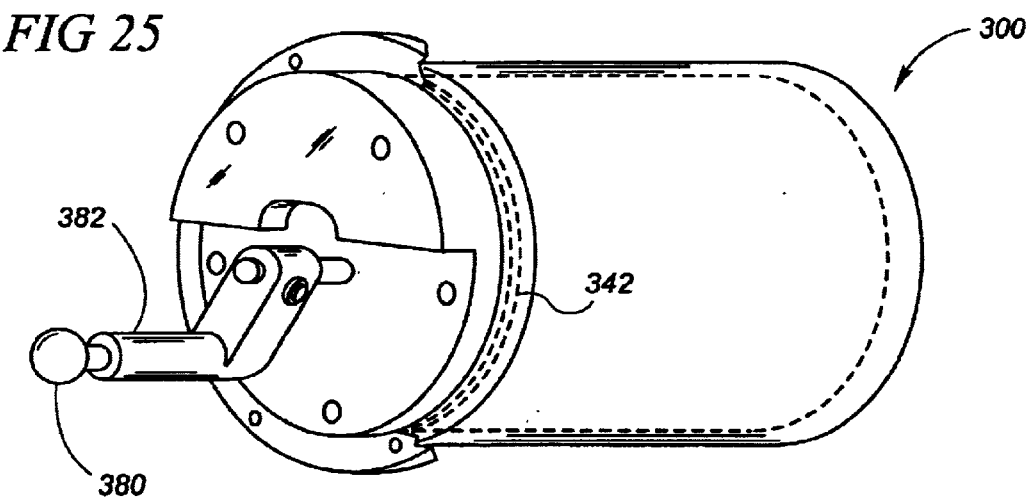
FIG. 25 is a side view of a system where movement of the seat depends on movement of an actuator that is coupled to the seat.
Figure 26A:
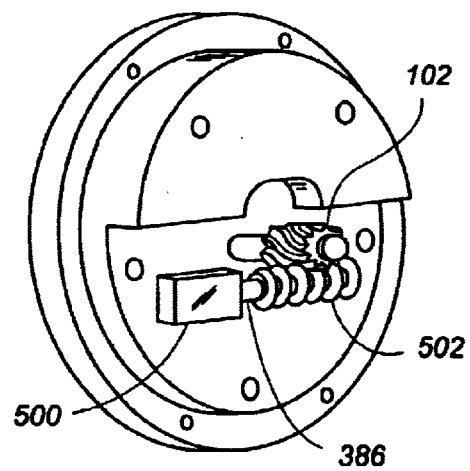
FIG. 26a is a side view of a system having a motor coupled to a geared drive shaft that is in contact with gearing on an arm, which together move the seat.

As shown in FIG. 24, a further embodiment of the invention is a means (320) for selectively redirecting, without interrupting, the pneumatic flow (312) to include a means (340) for moving a seat (342) that is located inside a body (344) of a valve (346). Further, the valve (346) is coupled to the driver source (304), the instrument (302), and a dummy load (328). In a still further embodiment, as shown in FIG. 25, the means (340) for moving the seat (342) includes a means (380) for moving an actuator (382) that is coupled to the seat (342). Further still, in yet another embodiment of the invention, as seen in FIG. 26a, the means (380) for moving the actuator (382) includes a means (386) for driving the actuator (382). In a further embodiment, a means (386) for driving the actuator (382) is a motor (500) with a geared drive shaft (502) in contact with gearing on the arm (102) that act in tandem to move the seat (342).

Figure 26B:
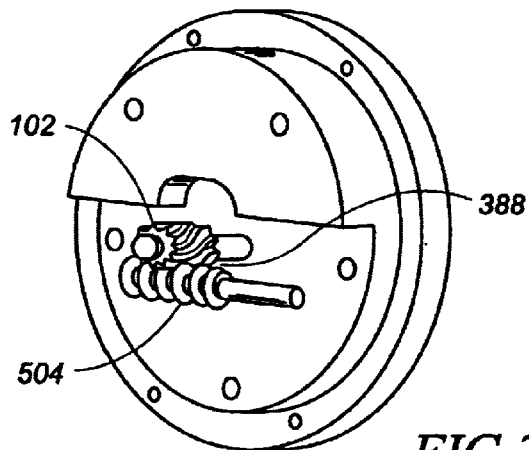
FIG. 26b is a side view of a system having a screwed gearing drive shaft that is in contact with screwed gearing on an arm, which together move the seat.

In a further embodiment of the invention, as shown in FIG. 26b, the means (380) for moving the actuator (382) includes a means (388) for turning the actuator (382). In a further embodiment, a means (388) for turning the actuator (382) is screwed gearing (504) coupled to the actuator (382). The screwed gearing (504) includes a drive shaft (6), which is connected to the bonnet (125), and works in tandem with screwed gearing on the arm (102).

Figure 26C:
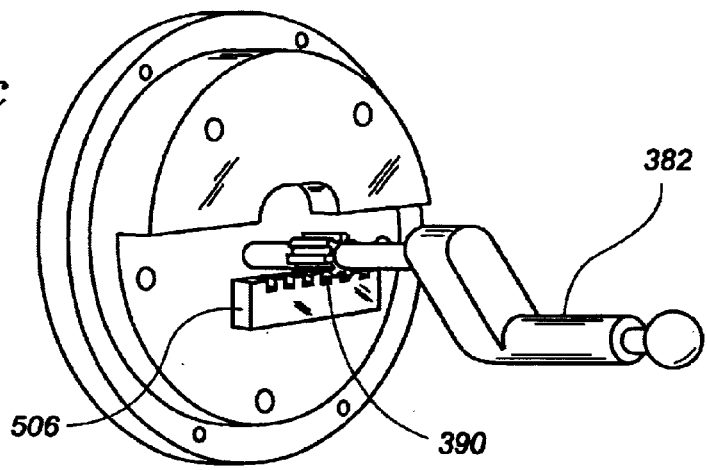
FIG. 26c is a side view of a system having a keyed gearing drive shaft that is in contact with keyed gearing on an arm, which together move the seat.

In a further embodiment of the invention, as shown in FIG. 26c, the means (380) for moving the actuator (382) includes a means (390) for sliding the actuator (382). In a still further embodiment, a means (390) for sliding the actuator (382) comprises keyed gearing (506) coupled to the actuator (382). The keyed gearing (506) includes a drive shaft (6), which is connected to the bonnet (125), and works in tandem with keyed gearing on the arm (102).

Figure 27:
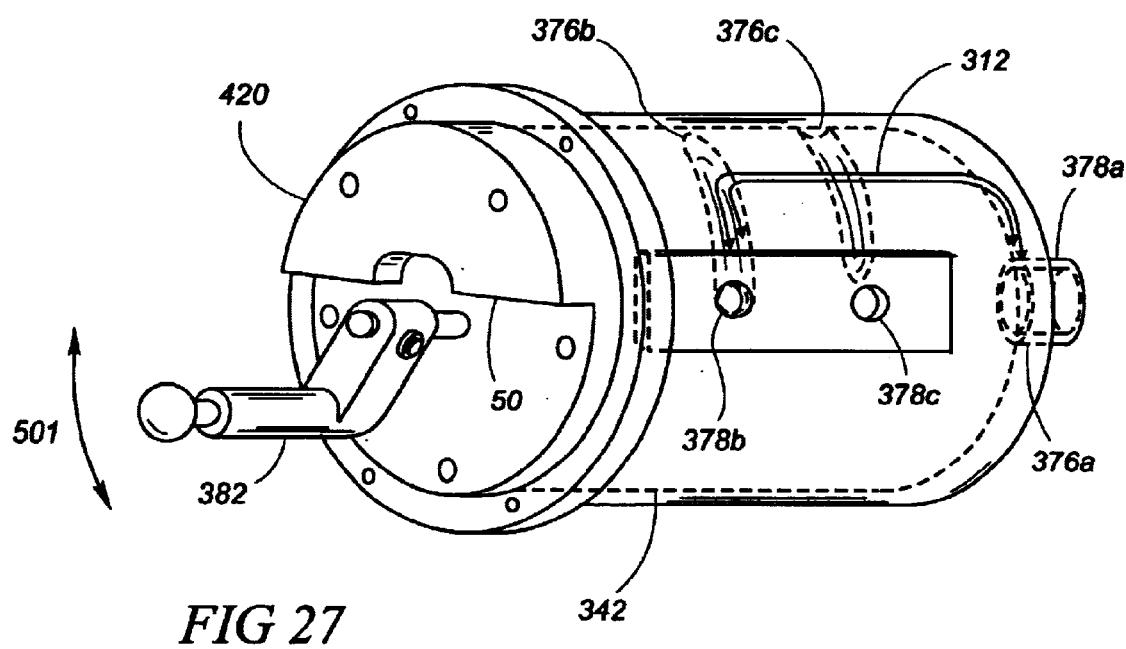
FIG. 27 is a side view of a system where a stop controls the seat's degree of movement.

In a further embodiment, as shown in FIG. 27, the means (380) for moving the actuator (382) includes a means (420) for limiting a rotary movement (501) of the seat (342). In a still further embodiment, a means (420) for limiting the rotary movement (501) comprises the actuator (382) contacting a stop (50). Contacting a stop (50) limits the range of motion for the actuator (382), which in turn, limits the range of motion for seat (342), and thereby, limits the number of rotations that the at least three apertures (376a, 376b, 376c) have in order to align with the at least three body apertures (378a, 378b, 378c) for redirecting the pneumatic flow (312) to the instrument (304) or the dummy load (328).

Figure 28A:
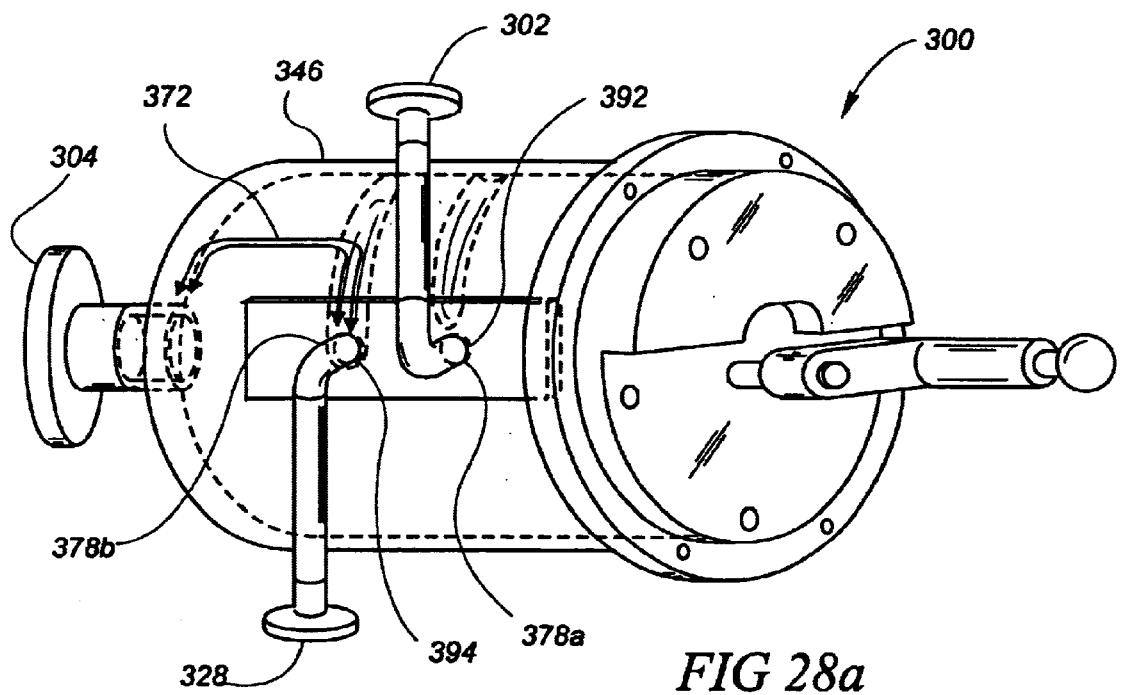
FIG. 28a is a side view of a system where the flow arrangement is only between the driver source and the instrument.

As shown in FIG. 28a, a further embodiment of the invention includes a means (340) for moving the seat. The means for moving the seat (340) includes a means (392) for covering one (378a) of the at least three body apertures (378a, 378b, and 378c) of the valve (346), thereby preventing a flow relationship (372) between the driver source (304) and the instrument (302).

In preventing the flow relationship (372) between the driver source (304) and the instrument (302), a still further embodiment unfolds by the same movement of the seat. In this further aspect of the embodiment, a means (340) for moving the seat also includes a means (394) for exposing another (378b) of the at least three body apertures (378a, 378b, and 378c) of the valve (346), thereby allowing the flow relationship (372) between the driver source (304) and a dummy load (328).

Figure 29A:
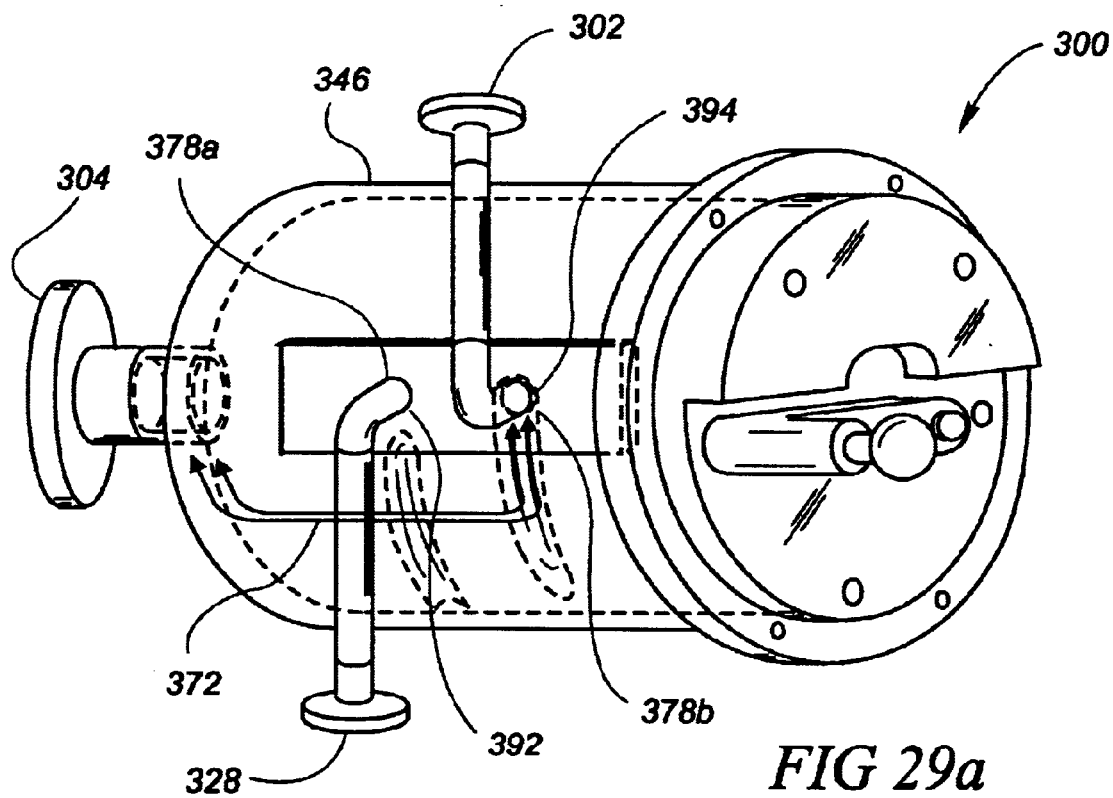
FIG. 29a is a side view of a system shows a system where the flow arrangement is only between the driver source and the dummy load.
Figure 29B:
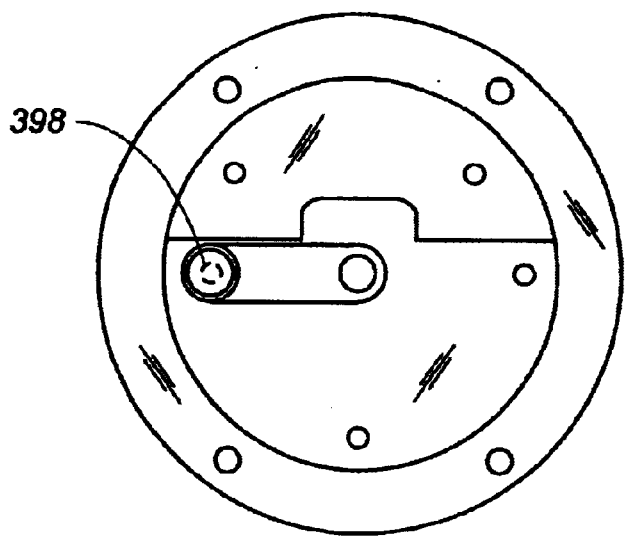
FIG. 29b is a frontal view of a system where the flow arrangement of FIG. 29a is locked into position.

As shown in FIG. 29a, a further embodiment of the invention includes a means (340) for moving the seat. The means for moving the seat (340) includes a means (392) for covering one (378a) of the at least three body apertures (378a, 378b, and 378c) of the valve (346), thereby preventing a flow relationship (372) between the driver source (304) and a dummy load (328). In preventing the flow relationship (372) between the driver source (304) and the dummy load (328), a still further embodiment unfolds by the same movement of the seat. In this further aspect of the embodiment, a means (340) for moving the seat also includes a means for exposing another (378b) of the at least three body apertures (378a, 378b, and 378c) of the valve (346), thereby allowing the flow relationship (372) between the driver source (304) and the instrument (302).

Figure 28B:
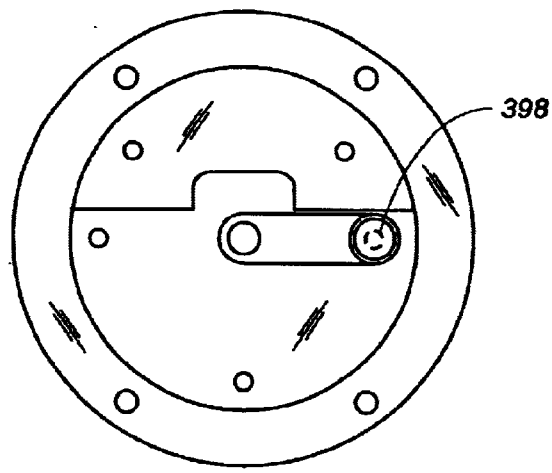
FIG. 28b is a frontal view of a system where the flow arrangement of FIG. 28a is locked into position.

As shown in FIG. 28b, a further embodiment of the invention is the means (320) for selectively redirecting to include a means (398) for locking the valve (346) to prevent a flow relationship (372) between the driver source (304) and the instrument (302). In this manner, the flow relationship (372) exists between the driver source (304) and the dummy load (328). For example, as seen in FIG. 19b, locking the valve (346) is accomplished by a pressure pin (11) extending from the actuator (382), and the pressure pin (11) locking into a pressure pinhole (12a or 12b) located on the bonnet (125) of the valve (346). Finally, in another embodiment of the invention, as shown in FIG. 29b, the means (320) for selectively redirecting includes a means (398) for locking the valve (346) to prevent a flow relationship (372) between the dummy load (328) and the instrument (302). In this manner, the flow relationship (372) exists between the driver source (304) and the instrument (302).

Now turning to a third aspect of the invention, a method exists for protecting a pneumatic-gyroscopic aircraft instrument (302). The drawings for the system claims are referenced below for purposes of discussing the method claims. In discussing the method claims, it is understood that any reference to the system claim drawings refers to elucidation of the method claims.

In one embodiment, as illustrated in FIG. 21, a method (200) for protecting a pneumatic-gyroscopic aircraft instrument (302), where the instrument (302) is driven by a driver source (304), includes the steps of allowing a pneumatic flow (312) to the instrument (302) during flight, and selectively redirecting, without interrupting, the pneumatic flow (312) of the driver source (304).

In a further embodiment, as shown in FIG. 22, allowing the pneumatic flow (312) to the instrument (302) includes coupling, through a valve (346), the driver source (304) to the instrument (302). In a still further embodiment, the valve (346) includes a first body aperture (378a) of at least three body apertures (378a, 387b, and 387c) coupled to the driver source (304) and a second body aperture (378b) of the at least three body apertures (378a, 387b, and 387c) coupled to the instrument (302). Coupling the valve to the instrument (302) and the driver source (304) is achieved through use of standard aircraft tubing or any other suitable coupling material.

As shown in FIG. 23, a further embodiment of the invention includes selectively redirecting, without interrupting, the pneumatic flow (312) by coupling, through a valve (346), the driver source (304) to a dummy load (328). In a still further embodiment of the invention, a first body aperture (378a) of at least three body apertures (378a, 387b, and 387c) is coupled to the driver source (304) and a third body aperture (378c) of the at least three body apertures (378a, 387b, and 387c) is coupled to the dummy load (328). Again, coupling the valve to the driver source (304) and the dummy load (328) is achieved through use of standard aircraft tubing or any other suitable coupling material.

As shown in FIG. 24, a further embodiment of the invention, selectively redirecting, without interrupting, the pneumatic flow (312) includes moving a seat (342) that is located inside a body (344) of a valve (346). Further, the valve (346) is coupled to the driver source (304), the instrument (302), and a dummy load (328). In a still further embodiment, as shown in FIG. 25, moving the seat (342) includes moving an actuator (382) that is coupled to the seat (342). Further still, in yet another embodiment of the invention, as seen in FIG. 26a, moving the actuator (382) includes driving the actuator (382). In a further embodiment, driving the actuator (382) is accomplished by a motor (500) with a geared drive shaft (502) in contact with gearing on the arm (102) that act in tandem to move the seat (342).

In a further embodiment of the invention, as shown in FIG. 26b, moving the actuator (382) includes turning the actuator (382). In a further embodiment, turning the actuator (382) includes using screwed gearing (504) that is coupled to the actuator (382). The screwed gearing (504) includes a drive shaft (6), which is connected to the bonnet (125), and works in tandem with screwed gearing on the arm (102).

In a further embodiment of the invention, as shown in FIG. 26c, moving the actuator (382) includes sliding the actuator (382). In a still further embodiment, sliding the actuator (382) includes using keyed gearing (506) that is coupled to the actuator (382). The keyed gearing (506) includes a drive shaft (6), which is connected to the bonnet (125), and works in tandem with keyed gearing on the arm (102).

In a further embodiment, as shown in FIG. 27, moving the actuator (382) includes limiting the rotary movement (501) of the seat (342). In a still further embodiment, limiting the rotary movement (501) includes the actuator (382) contacting a stop (50). Contacting a stop (50) limits the actuator's (382) range of motion, which in turn, limits the seat's (342), and thereby, limits the number of rotations that the at least three apertures (376a, 376b, 376c) have in order to align with the at least three body apertures (378a, 378b, 378c) for permitting or restraining the pneumatic flow (312) in the course of redirecting the pneumatic flow (312).

As shown in FIG. 28a, a further embodiment of the invention includes moving the seat. Moving the seat (340) includes covering one (378a) of the at least three body apertures (378a, 378b, and 378c) of the valve (346), which prevents a flow relationship (372) between the driver source (304) and the instrument (302). In preventing the flow relationship (372) between the driver source (304) and the instrument (302), a still further embodiment unfolds by the same movement of the seat (340). In this further aspect of the embodiment, moving the seat (304) also includes exposing another (378b) of the at least three body apertures (378a, 378b, and 378c) of the valve (346), which allows the flow relationship (372) between the driver source (304) and a dummy load (328) without interrupting the flow of the driver source (304)

As shown in FIG. 29a, a further embodiment of the invention includes moving the seat. Moving the seat (340) includes covering one (378a) of the at least three body apertures (378a, 378b, and 378c) of the valve (346), which prevents a flow relationship (372) between the driver source (304) and a dummy load (328). In preventing the flow relationship (372) between the driver source (304) and the dummy load (328), a still further embodiment unfolds by the same movement of the seat. In this further aspect of the embodiment, moving the seat also includes exposing another (378b) of the at least three body apertures (378a, 378b, and 378c) of the valve (346), which allows the flow relationship (372) between the driver source (304) and the instrument (302).

As shown in FIG. 28b, a further embodiment of the invention for selectively redirecting, without interrupting, the pneumatic flow (312) includes locking the valve (346) to prevent a flow relationship (372) between the driver source (304) and the instrument (302). In this manner, the flow relationship (372) exists between the driver source (304) and the dummy load (328). Finally, in another embodiment of the invention, as shown in FIG. 29b, the means (320) for selectively redirecting, without interrupting, the pneumatic flow (312) includes locking the valve (346) to prevent a flow relationship (372) between the dummy load (328) and the driver source (304).

In this manner, the flow relationship (372) exists between the driver source (304) and the instrument (302).

What is claimed is:

1. A system for protecting a pneumatic-gyroscopic aircraft instrument, the instrument being driven by a driver source, the system comprising:
   means for allowing a pneumatic flow to the instrument during flight; and
   means for selectively redirecting, without interrupting, the pneumatic flow to the instrument;
   wherein said means for selectively redirecting, without interrupting, the pneumatic flow comprises means for moving a seat located inside a body of a valve, wherein the valve is coupled to the driver source, the valve is coupled to the instrument, and the valve is coupled to a dummy load.

2. The system of claim 1, wherein the valve comprises a first body aperture of at least three body apertures coupled to the driver source and a second body aperture of the at least three body apertures coupled to the instrument.

3. The system of claim 1, wherein the valve comprises a first body aperture of at least three body apertures coupled to the driver source and a third body aperture of the at least three body apertures coupled to the dummy load.

4. The system of claim 1, wherein said means for moving the seat comprises means for moving an actuator coupled to the seat.

5. The system of claim 4, wherein said means for moving the actuator comprises means for driving the actuator.

6. The system of claim 4, wherein said means for moving the actuator comprises means for turning the actuator.

7. The system of claim 4, wherein said means for moving the actuator comprises means for sliding the actuator.

8. The system of claim 4, wherein said means for moving the actuator further comprises means for limiting a rotary movement of the seat.

9. The system of claim 8, wherein said means for limiting comprises the actuator in contact with a stop.

10. The system of claim 1, wherein said means for moving the seat comprises means for covering one of the at least three body apertures of the valve, thereby preventing a flow relationship between the driver source and the instrument.

11. The system of claim 10, wherein said means for moving the seat further comprises means for exposing another of the at least three body apertures of the valve, thereby allowing the flow relationship between the driver source and a dummy load.

12. The system of claim 1, wherein said means for moving the seat comprises means for covering one of the at least three body apertures of the valve, thereby preventing a flow relationship between the driver source and a dummy load.

13. The system of claim 12, wherein said means for moving the seat further comprises means for exposing another of the at least three body apertures of the valve, thereby allowing the flow relationship between the driver source and the instrument.

14. The system of claim 1, wherein said means for selectively redirecting, without interrupting, the pneumatic flow further comprises means for locking the valve to prevent a flow relationship between the dummy load and the instrument.

15. A system for protecting a pneumatic-gyroscopic aircraft instrument, the instrument being driven by a driver source, the system comprising:
   means for allowing a pneumatic flow to the instrument during flight; and
   means for selectively redirecting, without interrupting, the pneumatic flow to the instrument;

wherein said means for selectively redirecting, without interrupting, the pneumatic flow comprises means for locking a valve to prevent a flow relationship between the driver source and the instrument.

16. A system for use in an aircraft, comprising:

a source for providing a pneumatic flow;

a pneumatic gyroscopic aircraft instrument; and an adjustable valve that enables a flow arrangement between the source and the instrument, wherein the valve is adjustable between at least a first position that allows the pneumatic flow to the instrument and at least a second position that prevents the pneumatic flow to the instrument without interrupting the pneumatic flow from the source;

wherein the valve further enables a flow arrangement between the source and a dummy load.

17. The system of claim 16 wherein the valve is adapted to fit within an aircraft instrument panel.

18. The system of claim 16 further comprising an actuator adapted to adjust the valve between the first position and the second position.

19. The system of claim 16 wherein the valve allows the pneumatic flow to the dummy load when the valve is in the second position.

20. The system of claim 16 wherein the valve is adapted to gradually redirect the pneumatic flow from the instrument to the dummy load as the valve adjusts between the first position and the second position.

21. The system of claim 16 wherein the source connects to the valve through an open aperture and the instrument connects to the valve through a first closeable aperture.

22. The system of claim 21 wherein the first closeable aperture is at least partially open when the valve is in the first position and wherein the first closeable aperture is fully closed when the valve is in the second position.

23. A system for use in an aircraft, comprising:

a source for providing a pneumatic flow;

a pneumatic gyroscopic aircraft instrument;

an adjustable valve that enables a flow arrangement between the source and the instrument, wherein the valve is adjustable between at least a first position that allows the pneumatic flow to the instrument and at least a second position that prevents the pneumatic flow to the instrument without interrupting the pneumatic flow from the source;

wherein the source connects to the valve through an open aperture and the instrument connects to the valve through a first closeable aperture; and a dummy load connected to the valve through a second closeable aperture.

24. The system of claim 25 wherein the second closeable aperture is at least partially open when the valve is in the second position.

25. A system for use in an aircraft, comprising:

a first flow arrangement between a driver source and a pneumatic gyroscopic aircraft instrument;

a second flow arrangement between the driver source and a dummy load; and means for selectively redirecting a pneumatic flow between the first flow arrangement and the second flow arrangement without interrupting the pneumatic flow;

wherein the means prevents the pneumatic flow to the first flow arrangement when the pneumatic flow is redirected to the second flow arrangement.

26. The system of claim 25 wherein the means prevents the pneumatic flow to the second flow arrangement when the pneumatic flow is redirected to the first flow arrangement.

27. The system of claim 25 wherein the means allows the pneumatic flow to the first flow arrangement and to the second flow arrangement simultaneously.

28. The system of claim 25 wherein the means selectively redirects the pneumatic flow between the first flow arrangement and the second flow arrangement gradually.

29. The system of claim 25 wherein the first and second flow arrangements comprise standard aircraft tubing.

* * * * *